(12) United States Patent
Schedivy

(10) Patent No.: US 7,609,946 B2
(45) Date of Patent: Oct. 27, 2009

(54) PORTABLE VIDEO SYSTEM

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 865 days.

(21) Appl. No.: 10/808,659

(22) Filed: Mar. 25, 2004

(65) Prior Publication Data

US 2004/0228622 A1   Nov. 18, 2004

Related U.S. Application Data

(63) Continuation-in-part of application No. 10/438,724, filed on May 15, 2003, now Pat. No. 7,245,274, and a continuation-in-part of application No. 10/688,611, filed on Oct. 17, 2003, which is a continuation-in-part of application No. 10/438,724, said application No. 10/808,659 is a continuation-in-part of application No. 10/699,334, filed on Oct. 31, 2003, now Pat. No. 6,899,365, which is a continuation-in-part of application No. 10/438,724, said application No. 10/808,659 is a continuation-in-part of application No. 10/749,443, filed on Dec. 31, 2003, now Pat. No. 7,149,078, which is a continuation-in-part of application No. 10/438,724.

(51) Int. Cl.
*H04N 7/00* (2006.01)
*H04N 5/00* (2006.01)

(52) U.S. Cl. .......................... 386/125; 386/46

(58) Field of Classification Search .................. 386/46, 386/83, 125, 105, 106, 124

See application file for complete search history.

(56) References Cited

U.S. PATENT DOCUMENTS

| | | | |
|---|---|---|---|
| 3,019,050 A | 1/1962 | Speilman | 297/217.3 |
| 4,647,980 A | 3/1987 | Steventon et al. | |
| 4,681,366 A | 7/1987 | Lobanoff | 297/191 |
| 4,702,519 A | 10/1987 | Lobanoff | |
| 4,756,528 A | 7/1988 | Umashankar | 273/1 |
| 4,843,477 A | 6/1989 | Mizutani et al. | 358/248 |
| 4,982,996 A | 1/1991 | Vottero-Fin et al. | 297/217.3 |
| 5,021,922 A | 6/1991 | Davis et al. | |
| 5,214,514 A | 5/1993 | Haberkern | |

(Continued)

FOREIGN PATENT DOCUMENTS

EP   WO 00/38951   7/2000

(Continued)

OTHER PUBLICATIONS

Notice of Allowance and Fee(s) Due from corresponding U.S. Appl. No. 10/438,724, now U.S. Patent No. 7,245,275.

(Continued)

*Primary Examiner*—Robert Chevalier
(74) *Attorney, Agent, or Firm*—F. Chau & Associates, LLC.

(57) ABSTRACT

A video system attachable to a docking station includes a display capable of displaying video data received from the docking station, and a media player, wherein the video system is capable of operating when removed from the docking station. The video system is capable of connecting to at least one of a battery and an adapter for a power supply.

35 Claims, 23 Drawing Sheets

U.S. PATENT DOCUMENTS

| | | | | |
|---|---|---|---|---|
| 5,255,214 | A | 10/1993 | Ma | 361/680 |
| 5,267,775 | A | 12/1993 | Nguyen | 297/217.3 |
| 5,396,340 | A | 3/1995 | Ishii et al. | |
| 5,410,447 | A | 4/1995 | Miyagawa et al. | 361/681 |
| 5,507,556 | A | 4/1996 | Dixon | 297/217.3 |
| 5,555,466 | A | 9/1996 | Scribner et al. | 348/8 |
| 5,610,822 | A | 3/1997 | Murphy | |
| 5,796,575 | A | 8/1998 | Podwalny et al. | |
| 5,842,715 | A | 12/1998 | Jones | 297/217.3 |
| 5,949,345 | A | 9/1999 | Beckert et al. | 340/815.41 |
| 6,081,420 | A | 6/2000 | Kim et al. | 361/681 |
| 6,092,705 | A | 7/2000 | Meritt | 296/37.16 |
| 6,102,476 | A | 8/2000 | May et al. | 297/217.3 |
| D438,853 | S | 3/2001 | Iino | D14/136 |
| 6,216,927 | B1 | 4/2001 | Meritt | |
| 6,266,236 | B1 | 7/2001 | Ku et al. | 361/681 |
| 6,292,236 | B1 | 9/2001 | Rosen | 348/837 |
| 6,339,455 | B1 | 1/2002 | Allan et al. | |
| 6,380,978 | B1 | 4/2002 | Adams et al. | |
| 6,409,242 | B1 | 6/2002 | Chang | 296/37.7 |
| 6,443,574 | B1 | 9/2002 | Howell et al. | |
| 6,587,127 | B1 | 7/2003 | Leeke et al. | |
| 6,665,163 | B2 | 12/2003 | Yanagisawa | |
| 6,669,285 | B1 | 12/2003 | Park et al. | 297/217.3 |
| 6,719,343 | B2 | 4/2004 | Emerling et al. | 296/24.34 |
| 6,724,317 | B1 | 4/2004 | Kitano et al. | 340/691.1 |
| 6,739,654 | B1 | 5/2004 | Shen et al. | 297/217.3 |
| 6,871,356 | B2 | 3/2005 | Chang | 725/75 |
| 6,899,365 | B2 | 5/2005 | Lavelle et al. | |
| D515,522 | S | 2/2006 | Vitito | D14/126 |
| 7,036,879 | B2 | 5/2006 | Chang | |
| 7,044,546 | B2 | 5/2006 | Chang | 297/217.3 |
| 7,201,354 | B1 | 4/2007 | Lee | |
| 7,201,356 | B2 | 4/2007 | Huang | |
| 7,360,833 | B2 | 4/2008 | Vitito | |
| 2001/0001083 | A1 | 5/2001 | Helot | 439/131 |
| 2002/0186531 | A1 | 12/2002 | Pokharna et al. | 361/687 |
| 2003/0021086 | A1 | 1/2003 | Landry et al. | 361/683 |
| 2003/0111880 | A1 | 6/2003 | Lambiaso | 297/217.3 |
| 2003/0137584 | A1 | 7/2003 | Norvell et al. | 348/61 |
| 2003/0184137 | A1 | 10/2003 | Jost | 297/219.1 |
| 2003/0198008 | A1 | 10/2003 | Leapman et al. | 361/681 |
| 2004/0007906 | A1 | 1/2004 | Park et al. | 297/217.3 |
| 2004/0130616 | A1 | 7/2004 | Tseng | |
| 2004/0227696 | A1 | 11/2004 | Schedivy | |
| 2005/0242636 | A1 | 11/2005 | Vitito | |
| 2005/0242637 | A1 | 11/2005 | Vitito | |
| 2005/0242638 | A1 | 11/2005 | Vitito | |
| 2006/0109388 | A1* | 5/2006 | Sanders et al. | 348/837 |
| 2006/0112144 | A1 | 5/2006 | Ireton | |
| 2006/0148575 | A1* | 7/2006 | Vitito | 463/46 |
| 2007/0108788 | A1* | 5/2007 | Shalam et al. | 296/37.15 |

FOREIGN PATENT DOCUMENTS

| | | |
|---|---|---|
| FR | 2817812 | 6/2002 |
| FR | 2 829 980 | 3/2003 |
| JP | 2001-047921 | 2/2001 |
| WO | WO 02/074577 A1 | 9/2002 |
| WO | WO 03/029050 A1 | 4/2003 |

OTHER PUBLICATIONS

Office Action mailed Jan. 10, 2007 from corresponding U.S. Appl. No. 10/438,724, now U.S. Patent No. 7,245,275.

Office Action mailed Jun. 5, 2006 from corresponding U.S. Appl. No. 10/438,724, now U.S. Patent No. 7,245,275.

Office Action mailed Oct. 4, 2005 from corresponding U.S. Appl. No. 10/438,724, now U.S. Patent No. 7,245,275.

Notice of Allowance and Fee(s) Due from corresponding U.S. Appl. No. 10/749,443 now U.S. Patent No. 7,149,078.

Office Action mailed Apr. 27, 2006 from corresponding U.S. Appl. No. 10/749,443 now U.S. Patent No. 7,149,078.

Office Action mailed Dec. 21, 2005 from corresponding U.S. Appl. No. 10/749,443 now U.S. Patent No. 7,149,078.

Office Action mailed Jul. 13, 2007 from corresponding U.S. Appl. No. 10/688,611.

Office Action mailed Dec. 27, 2006 from corresponding U.S. Appl. No. 10/688,611.

Office Action mailed Jun. 16, 2006 from corresponding U.S. Appl. No. 10/688,611.

Notice of Allowance from corresponding U.S. Appl. No. 10/699,334 now U.S. Patent No. 6,899,365.

Office Action mailed Aug. 2, 2004 from corresponding U.S. Appl. No. 10/699,334 now U.S. Patent No. 6,899,365.

International Search Report from Corresponding PCT Application No. PCT/US2004/34371.

Office Action mailed Feb. 26, 2008 from U.S. Appl. No. 11/072,171.

Office Action dated Sep. 12, 2008 from U.S. Appl. No. 11/072,171.

Office Action mailed Mar. 11, 2009 from corresponding U.S. Appl. No. 11/072,171.

* cited by examiner

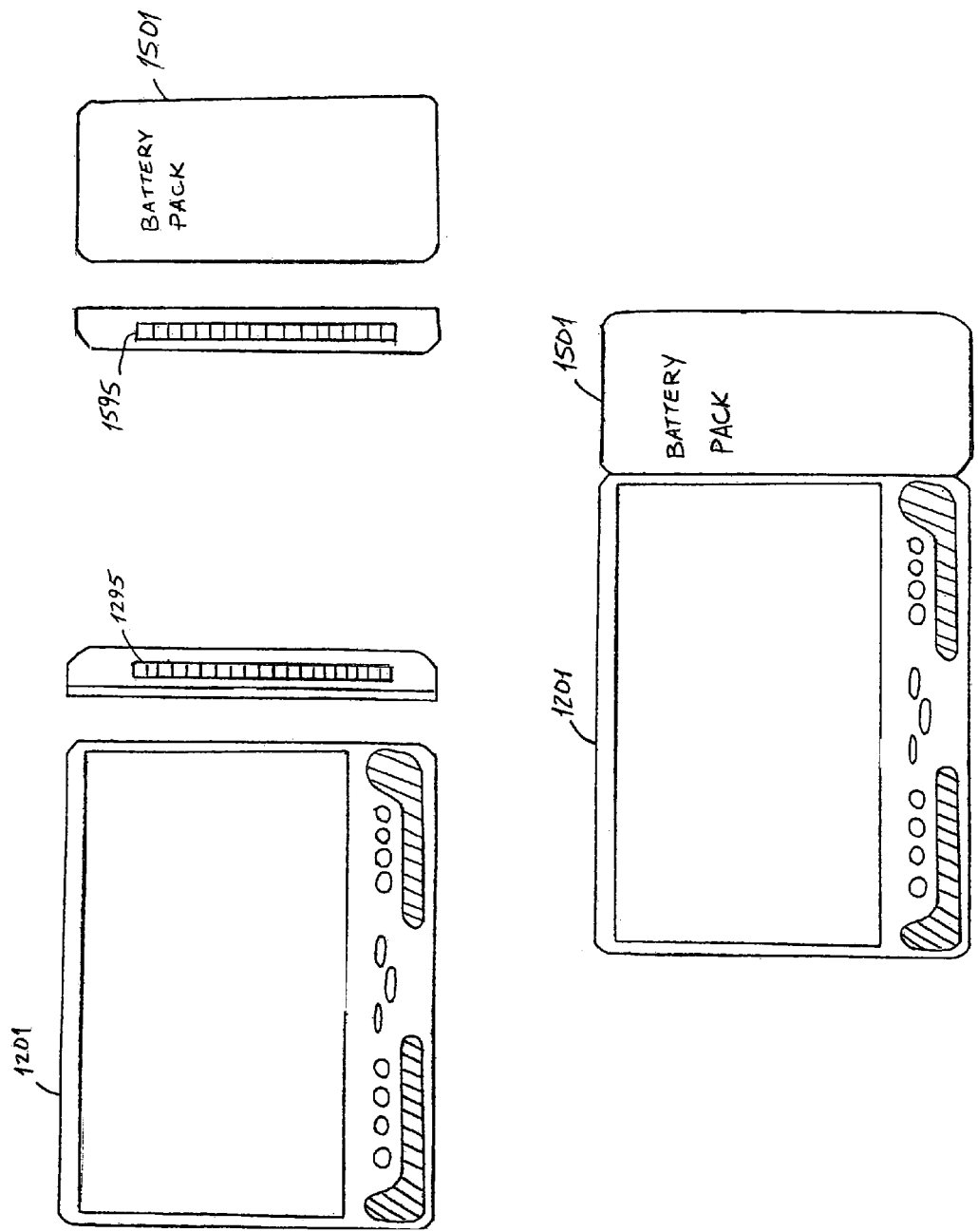

PORTABLE VIDEO SYSTEM

CROSS-REFERENCES TO RELATED APPLICATIONS

This application is a Continuation-In-Part of U.S. application Ser. No. 10/438,724, filed on May 15, 2003 now U.S. Pat. No. 7,245,274, the disclosure of which is incorporated herein in its entirety by reference.

This application is also a Continuation-In-Part of U.S. application Ser. No. 10/688,611, filed on Oct. 17, 2003, which is a Continuation-In-Part of U.S. application Ser. No. 10/438,724, filed on May 15, 2003. The disclosure of U.S. application Ser. No. 10/688,611 is incorporated herein in its entirety by reference.

This application is also a Continuation-In-Part of U.S. application Ser. No. 10/699,334, filed on Oct. 31, 2003 now U.S. Pat. No. 6,899,365, which is a Continuation-In-Part of U.S. application Ser. No. 10/438,724, filed on May 15, 2003. The disclosure of U.S. application Ser. No. 10/699,334 is incorporated herein in its entirety by reference.

This application is also a Continuation-In-Part of U.S. application Ser. No. 10/749,443, filed on Dec. 31, 2003 now U.S. Pat. No. 7,149,078, which is a Continuation-In-Part of U.S. application Ser. No. 10/438,724, filed on May 15, 2003. The disclosure of U.S. application Ser. No. 10/749,443 is incorporated herein in its entirety by reference.

BACKGROUND OF THE INVENTION

1. Technical Field

The present invention relates to a video system, and more particularly to a portable video system capable of being secured to a docking station.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle, and only from particular vantage points within the vehicle. Further, there is also a risk of theft of the video screen and video player and corresponding damage to the vehicle when the vehicle is unattended.

Therefore, a need exists for a portable video system capable of being mounted to a docking station.

SUMMARY OF THE INVENTION

According to an embodiment of the present invention, a docking station for supporting a removable video system, includes a connector for electrically coupling the docking station to the removable video system, and at least one port for connecting a media source to the docking station, wherein data from the media source is provided to the docking station via the at least one port and to the removable video system via the connector.

The at least one port may be one of a universal serial bus port, an audio input port, a video input port and an audio/video input port. The data may include at least one of audio data and video data. The media source may be one of an MPEG player, a card reader, a DVD player, a CD-ROM player, a video game player, a videocassette player, and a digital video recorder. The docking station may receive a media storage medium and data from the media storage medium is provided to the removable video system via the connector. The docking station may receive the media storage medium through a slot positioned in the docking station. The media storage medium may be at least one of a digital video disc, a compact disc, a video compact disc, a flash card, a secure digital card, a smart media card and a memory stick card. The docking station may also include a television tuner, wherein a program received by the television tuner is provided to the removable video system via the connector.

The docking station may be mounted in an interior portion of a vehicle to the ceiling, wall or seat of the vehicle. The docking station may also be mounted to a ceiling, a wall or a piece of furniture in a room. The docking station may also be free standing. The docking station may include a stationary portion and a swinging portion attached to the stationary portion, wherein the removable video system is secured to the swinging portion. The docking station may also include a light positioned on the docking station and a speaker positioned on the docking station. The docking station may be connectable to a battery and may include a port for connecting to an adapter for a power supply.

The removable video system may include a display capable of displaying video data received from the docking station. The display may be one of a liquid crystal display device, a cathode ray tube device, a gas plasma device or an organic electro-luminescent display device. The removable video system may include at least one port for connecting a media source to the video system, wherein data from the media source is provided to the video system via the at least one port. The removable video system may include a media player, wherein the media player is capable of playing media stored on at least one of a digital video disc, a compact disc, a video compact disc, a flash card, a secure digital card, a smart media card and a memory stick card.

The removable video system may be capable of operating when remote from the docking station, wherein the removable video system is capable of connecting to at least one of a battery and an adapter for a power supply.

According to an embodiment of the present invention, a video system attachable to a docking station includes a display capable of displaying video data received from the docking station, and a media player, wherein the video system is capable of operating when removed from the docking station.

The video system may be capable of connecting to at least one of a battery and an adapter for a power supply. The media player may be capable of playing media stored on at least one of a digital video disc, a compact disc, a video compact disc, a flash card, a secure digital card, a smart media card and a memory stick card.

The video system may also include at least one port for connecting a media source to the video system, wherein data from the media source is provided to the video system via the at least one port. The data may include at least one of audio data and video data. The at least one port may be one of a universal serial bus port, an audio input port, a video input port and an audio/video input port. The media source may be one of an MPEG player, a card reader, a DVD player, a CD-ROM player, a video game player, a videocassette player, and a digital video recorder. The video system may also include a television tuner, wherein a program received by the television tuner is broadcast on the video system.

The docking station may be mounted in a room or in an interior portion of a vehicle. The docking station may be mounted to a structure or be free standing.

The display may be one of a liquid crystal display device, a cathode ray tube device, a gas plasma device or an organic electro-luminescent display device.

The docking station may receive the video data from one of a media source built in to the docking station or an external media source connected to the docking station.

BRIEF DESCRIPTION OF THE DRAWINGS

Preferred embodiments of the present invention will be described below in more detail, with reference to the accompanying drawings:

FIG. 15 shows illustrations of a video system and a battery pack according to an embodiment of the present invention.

DETAILED DESCRIPTION OF PREFERRED EMBODIMENTS

According to an embodiment of the present invention, a portable video system can be coupled to a vehicle headrest. The portable video system receives a data media comprising data to be displayed. The video system is secured to a docking station mounted in the headrest. The video system is removable, such that the video system can be disconnected from the docking station.

Figure 1:
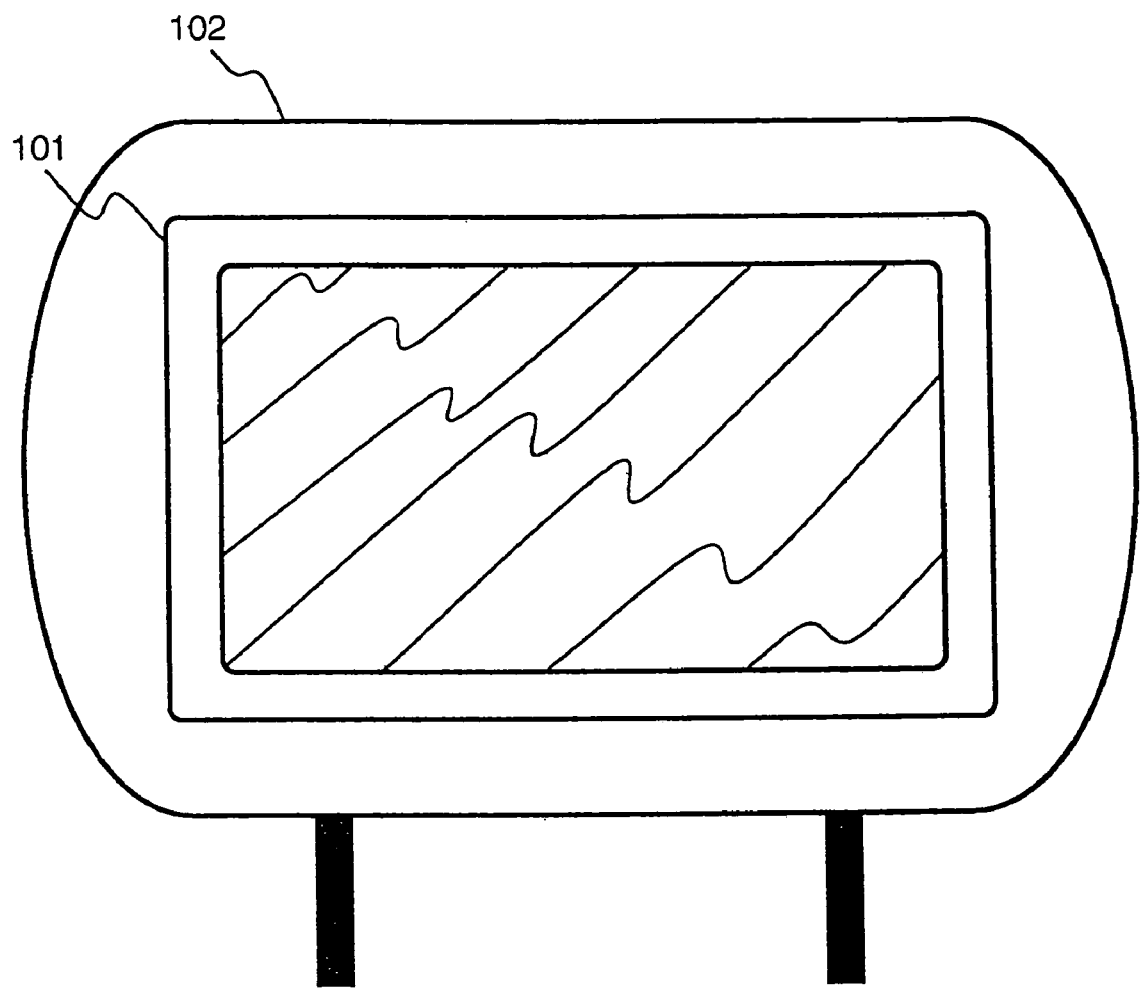
FIG. 1 is an illustration of a video screen installed in a vehicle headrest.
Figure 2:
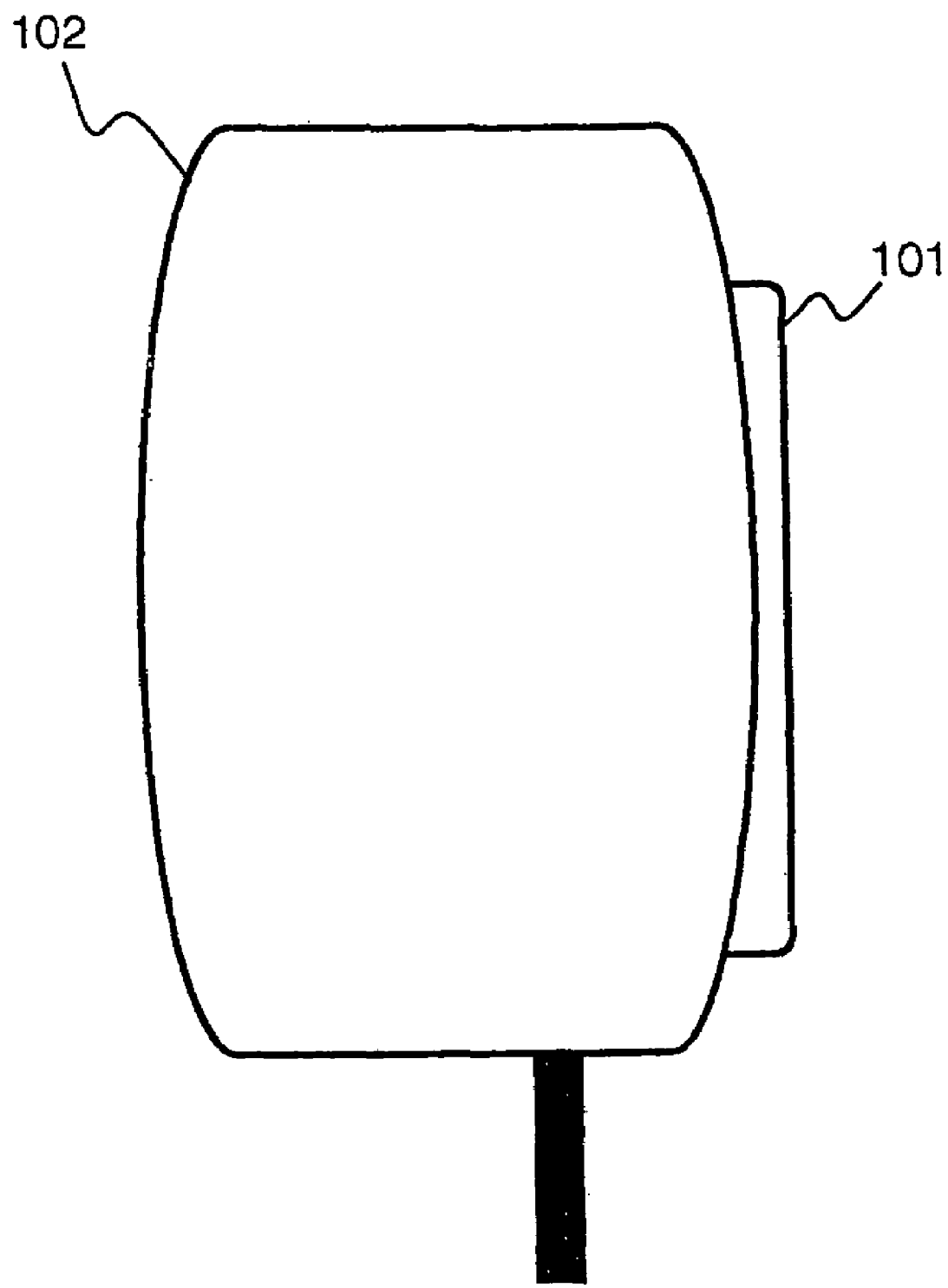
FIG. 2 is an illustration of a video screen installed in a vehicle headrest.
Figure 3A:
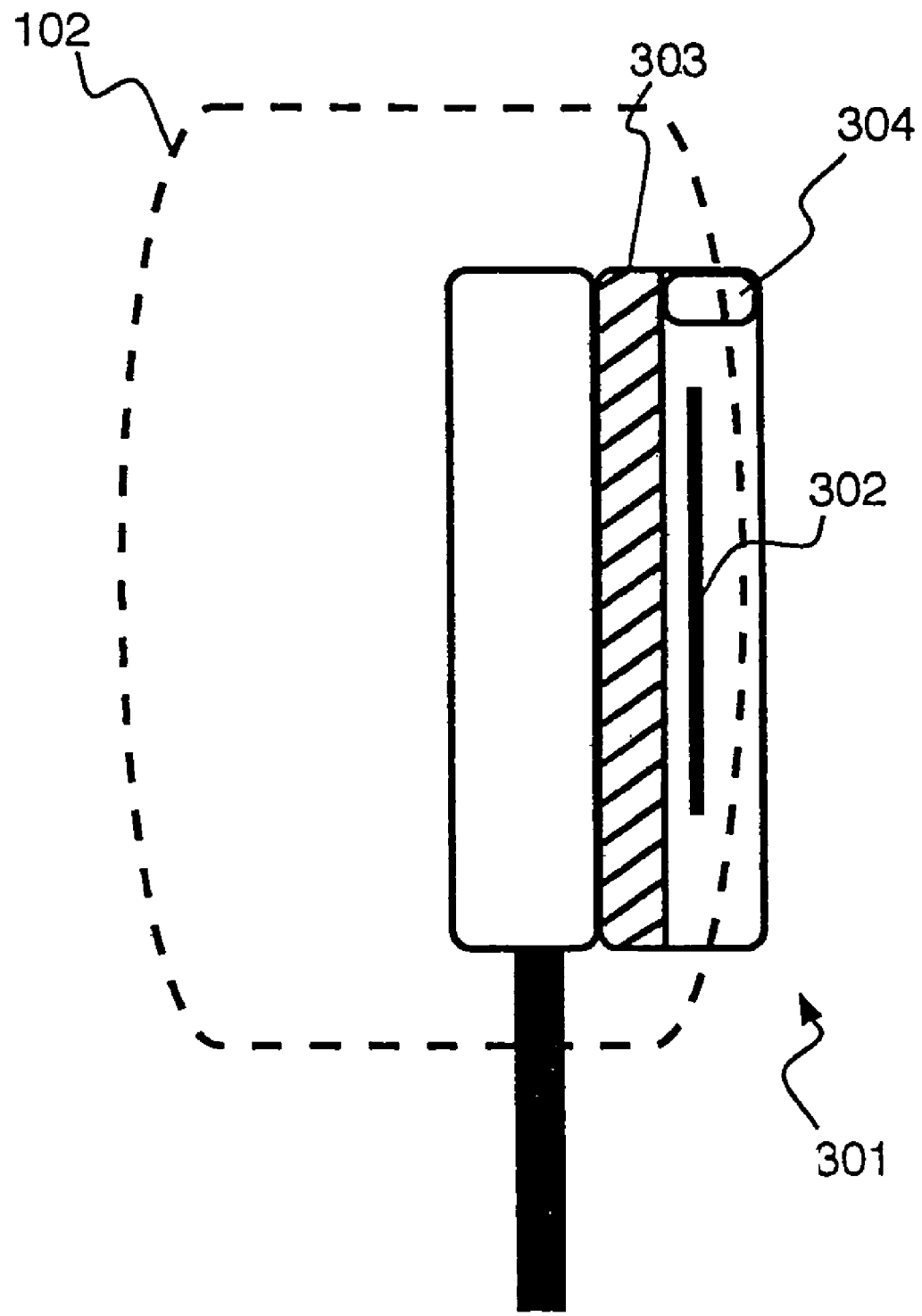
FIG. 3A is an illustration of a side view of a video system and docking station according to an embodiment of the present invention.

Referring to FIG. 3A, the portable video system can be embodied as a slot-type video system 301 comprising a slot 302 that receives a data media into a mechanism for accessing data stored on the medium, such as a digital videodisk (DVD) player, MPEG player 3 (MP3) disk, or video game disk. The video system 301 is secured to a docking station 303. The video system 301 comprises a hinge 304. The hinge connects a video screen portion of the video system to a base portion of the video system.

Figure 3B:
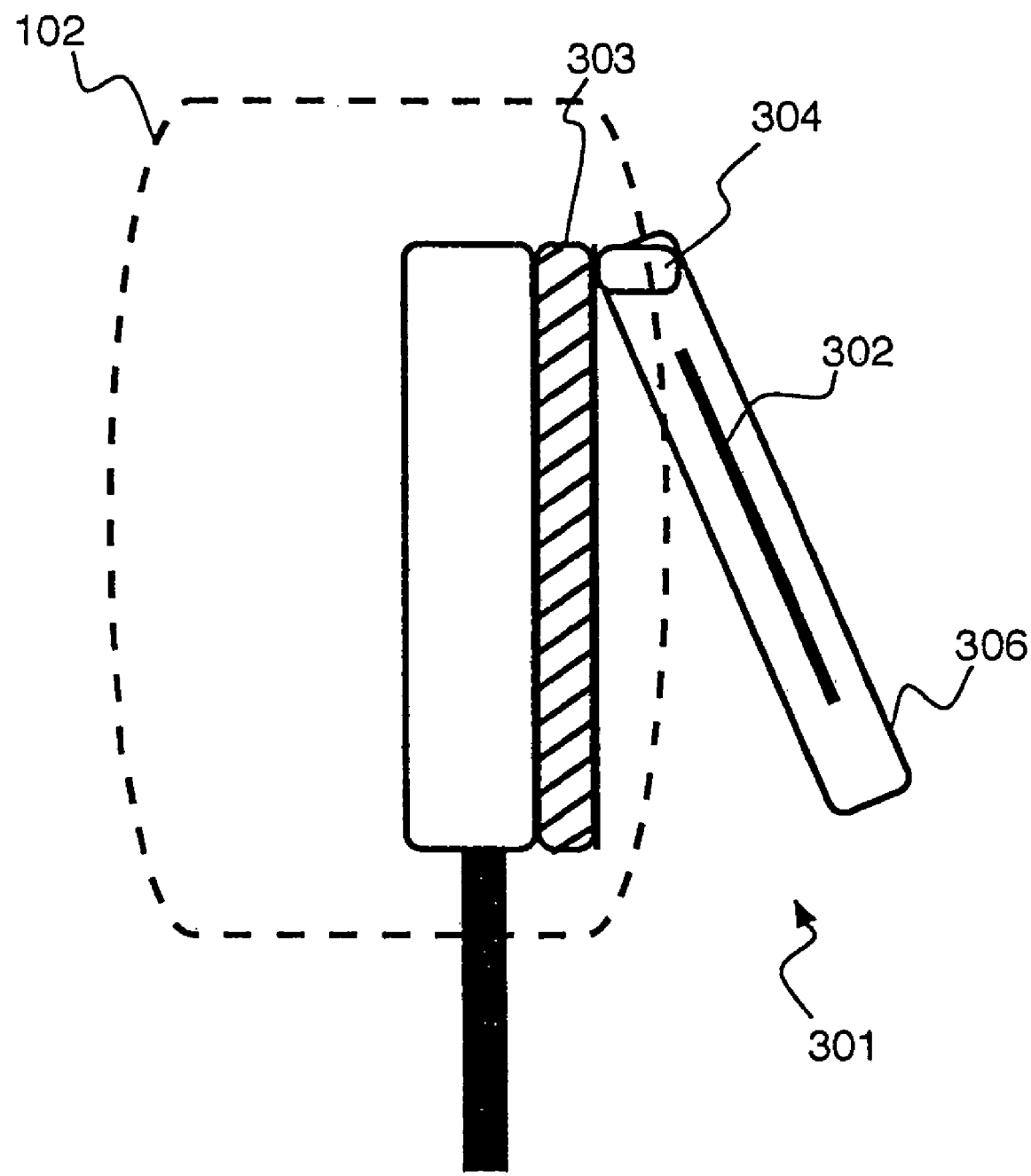
FIG. 3B is an illustration of a side view of a video system and docking station according to an embodiment of the present invention.
Figure 4A:
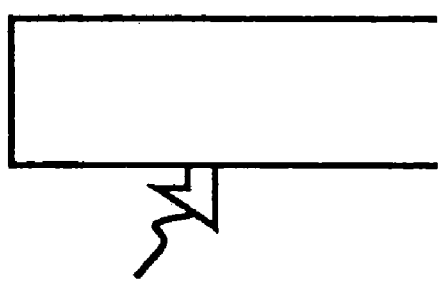
FIGS. 4A and 4B are illustrations of a docking station according to an embodiment of the present invention.
Figure 4B:
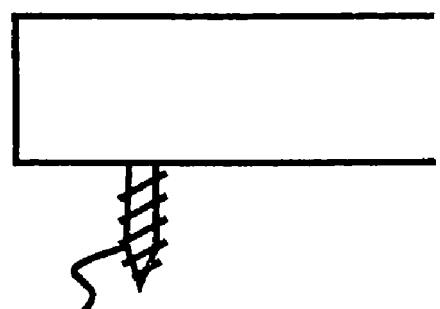
Figure 5A:
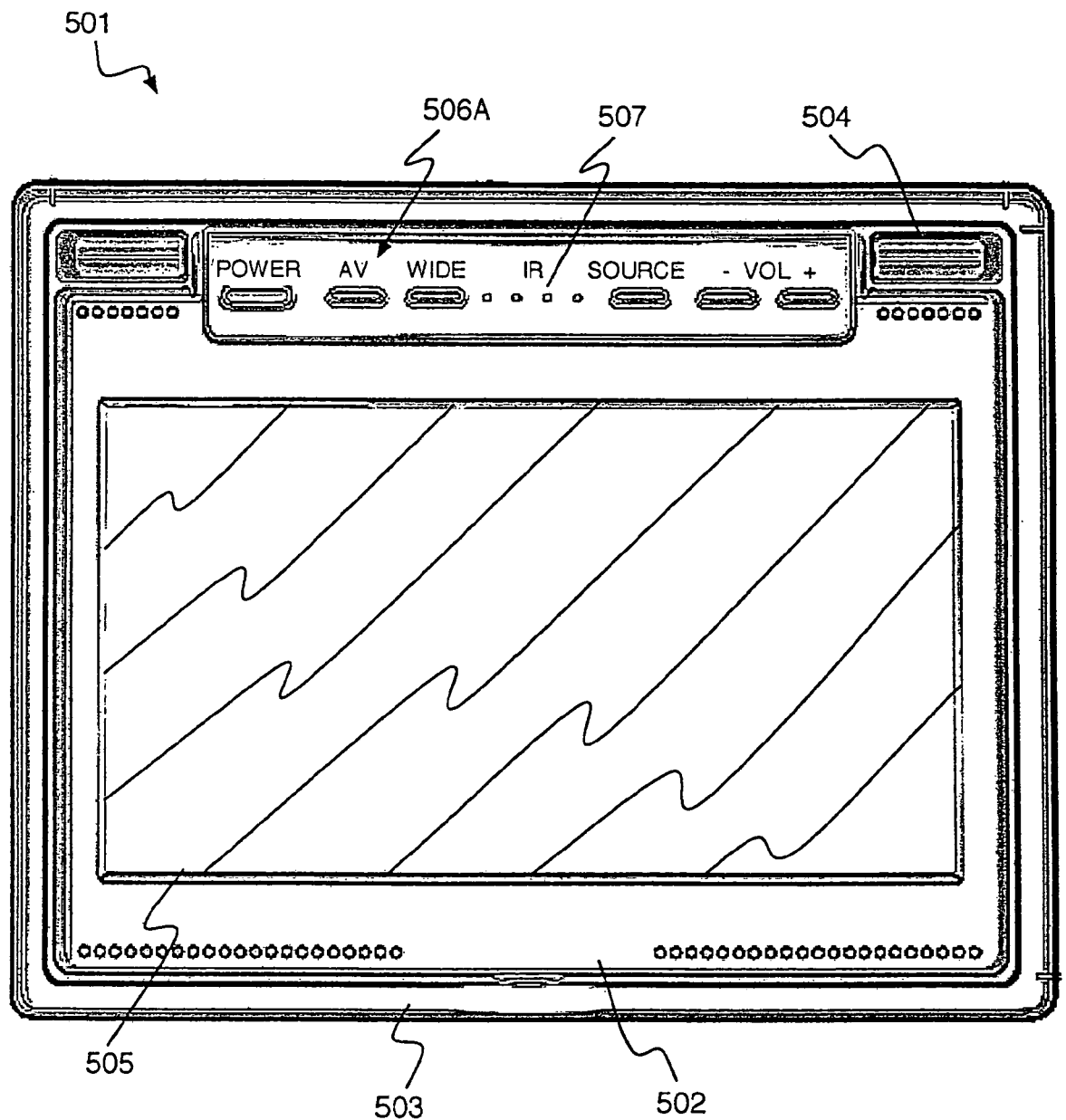
FIG. 5A is an illustration of a front view of a clamshell-type video system according to an embodiment of the present invention.
Figure 5B:
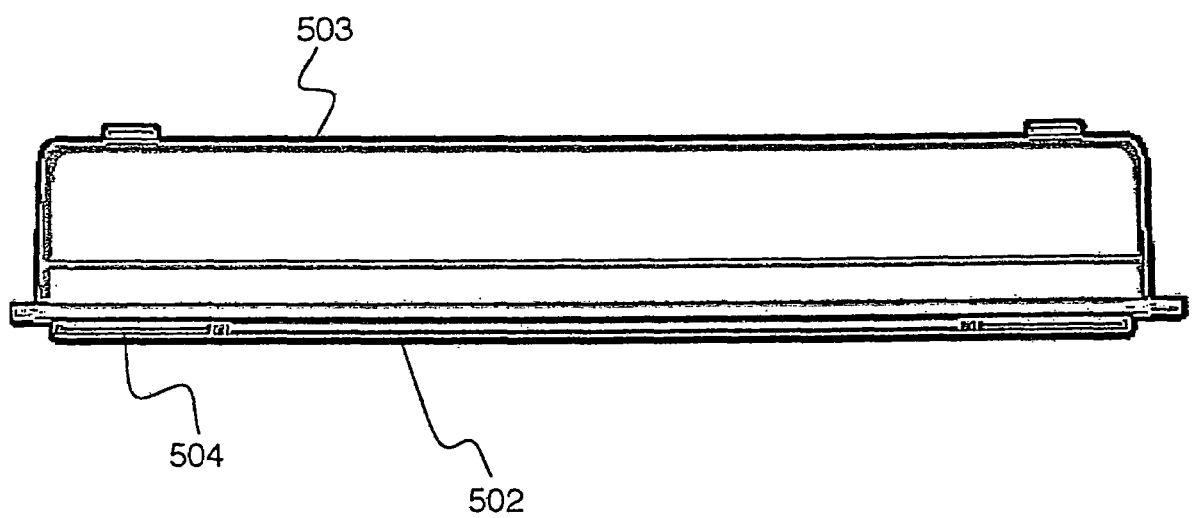
FIG. 5B is an illustration of a top view of a clamshell-type video system according to an embodiment of the present invention.
Figure 5C:
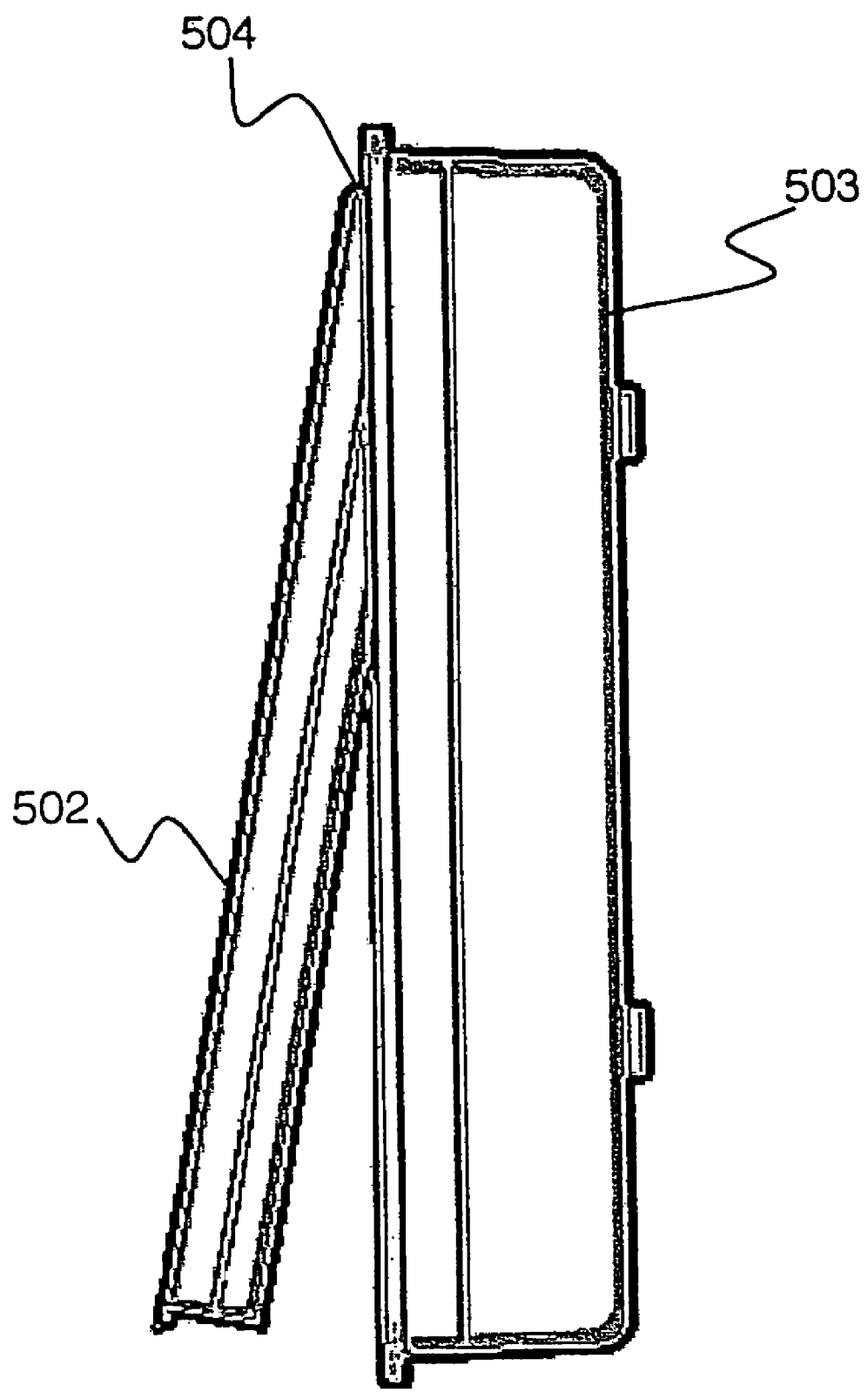
FIG. 5C is an illustration of a side view of a clamshell-type video system according to an embodiment of the present invention.
Figure 5D:
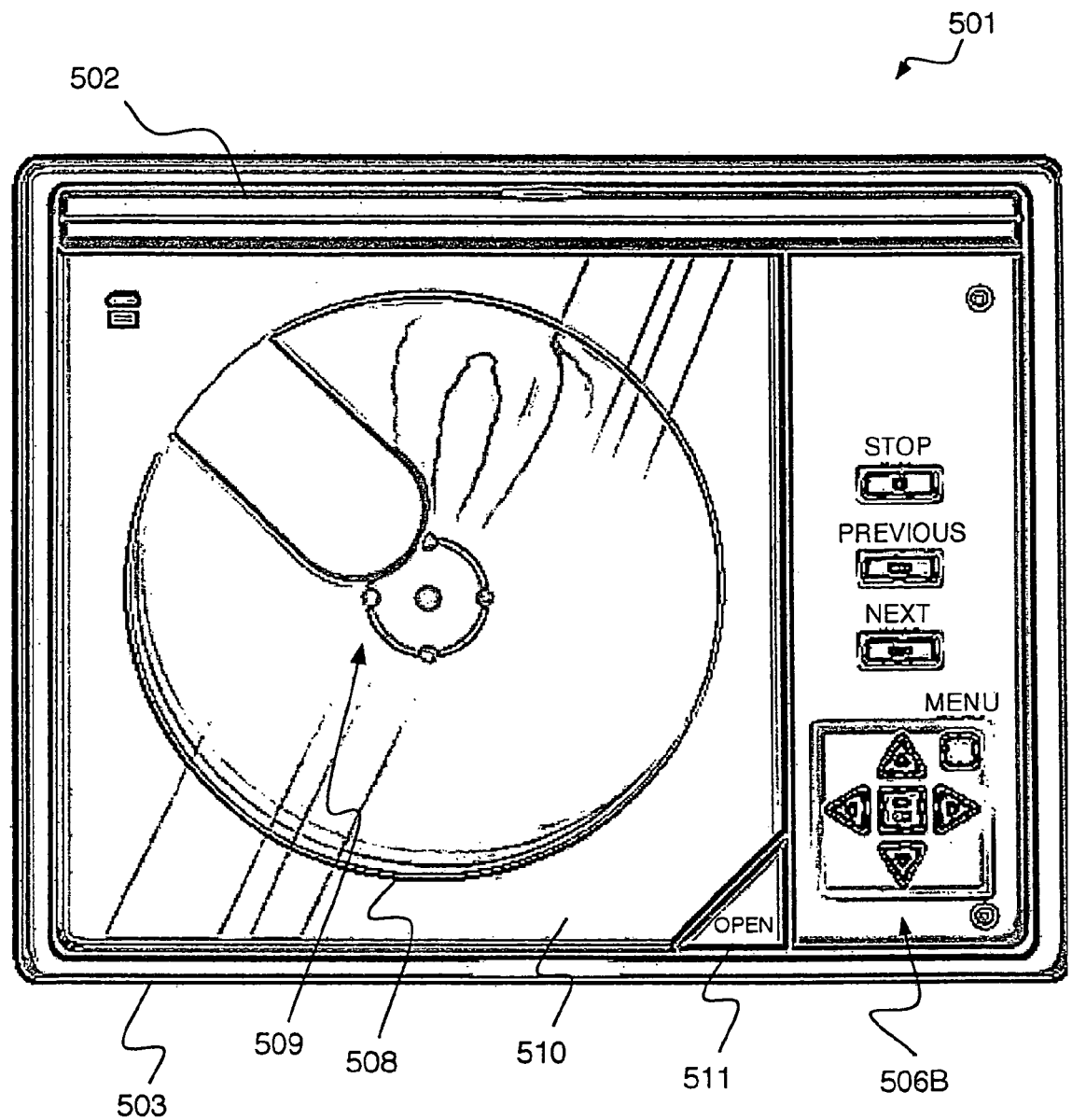
FIG. 5D is an illustration of a front view of a clamshell-type video system in an open position according to an embodiment of the present invention.

As shown in FIG. 3B, the docking station 303 is secured in the headrest 102, and more particularly to an internal headrest support structure 305. The docking station 303 can be secured by, for example, a catch 401 as shown in FIG. 4A and/or a screw 402 as shown in FIG. 4B. One of ordinary skill in the art would recognize that other means of securing the docking station can be used, for example, an adhesive compound. The docking station 303 secures a base portion of the video system 301, and allows a video screen portion 306 to pivot away from the base portion. In a slot-type device, as shown in FIG. 3B, the slot 302 is exposed for receiving a data media when the video screen portion 306 is in a pivoted position away from the base portion of the video system 301.

Figure 3C:
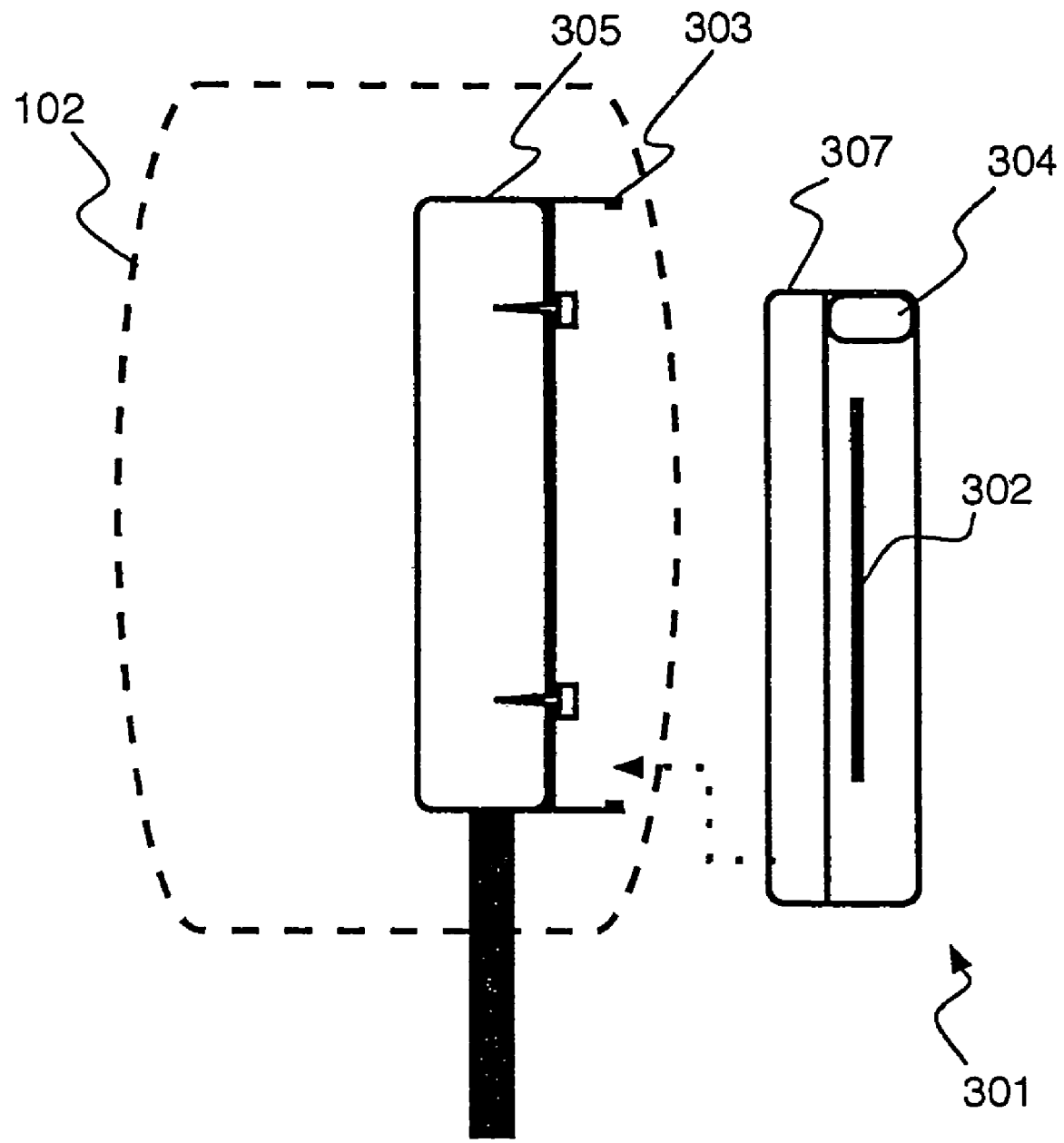
FIG. 3C is an illustration of a side view of an undocking stationed video system according to an embodiment of the present invention.

As shown in FIG. 3C, the video system 301 can be disconnected from the docking station 303 (cut away view). The video system 301 can be operated autonomously. That is, when decoupled from the docking station 303, the video system 301 can access a data media to play, for example, a movie. When disconnected from the docking station, the video system can operate on power supplied by an optional battery or a connection to an external power supply, such as an AC or DC current. The connection can be to the base portion 307 of the video system 301.

Figure 3D:
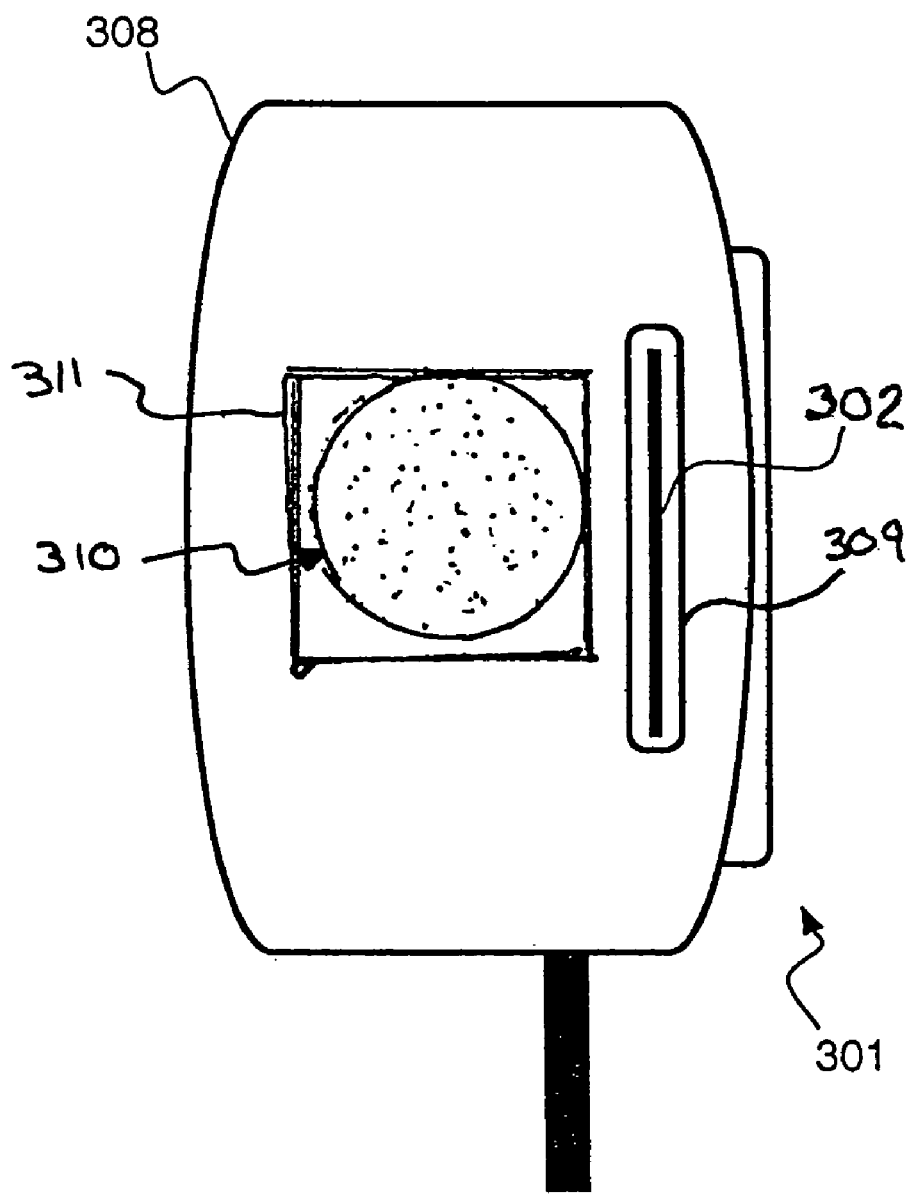
FIG. 3D is an illustration of a side view of a video system according to an embodiment of the present invention

Referring to FIG. 3D, a headrest 308 can comprise an opening 309 for receiving a data media into the video system 301. The video system 301 can be a permanently installed or portable video system. The headrest opening 309 aligns with the slot 302 of the video system 301 to allow data media, such as a DVD or MP3 disk to be inserted from the side, top, or bottom of the headrest 308. The headrest 308 further comprises vents 310 for dissipating heat. A cooling fan 311 for increasing airflow can also be added within the headrest. The cooling fan 311 can be located in the headrest 308 and behind the vent 310, such that the cooling fan 311 is concealed.

Referring to FIGS. 5A through 5D, a portable video system 501 of a clamshell-type is secured to a docking station. The portable video system 501 comprises a door 502 and a base portion 503 connected by a hinge 504. The door 502 pivots away from the base portion 503 on the hinge 504. The hinge 504 can be positioned on any side of the door 502. The door 502 comprises a video screen 505, controls 506A, and an infrared (IR) transmitter and/or receiver 507. The video system 501 receives a data media 508 comprising data to be accessed. When the door 502 is closed the data media 505 is secured. The door 502 can be opened by, for example, depressing a button releasing the door 503 from the base portion 503 or pulling the door 502 away from the base 503 wherein the hinge 504 is a friction fitting. A media player 509 is concealed by cover 510. The cover 510 can be opened by, for example, depressing a button 511. The video system 501 is removable, such that the video system can be disconnected from the docking station 303.

The base 503 comprises a control panel 506B. The control panel 506B comprises a plurality of controls for controlling the functions of the media player, for example, volume control, previous, next, pause, eject and play, and a power on/off button. The controls 506A and 506B can be, for example, buttons, switches, a touch sensitive liquid crystal display, and the like.

Figure 6A:
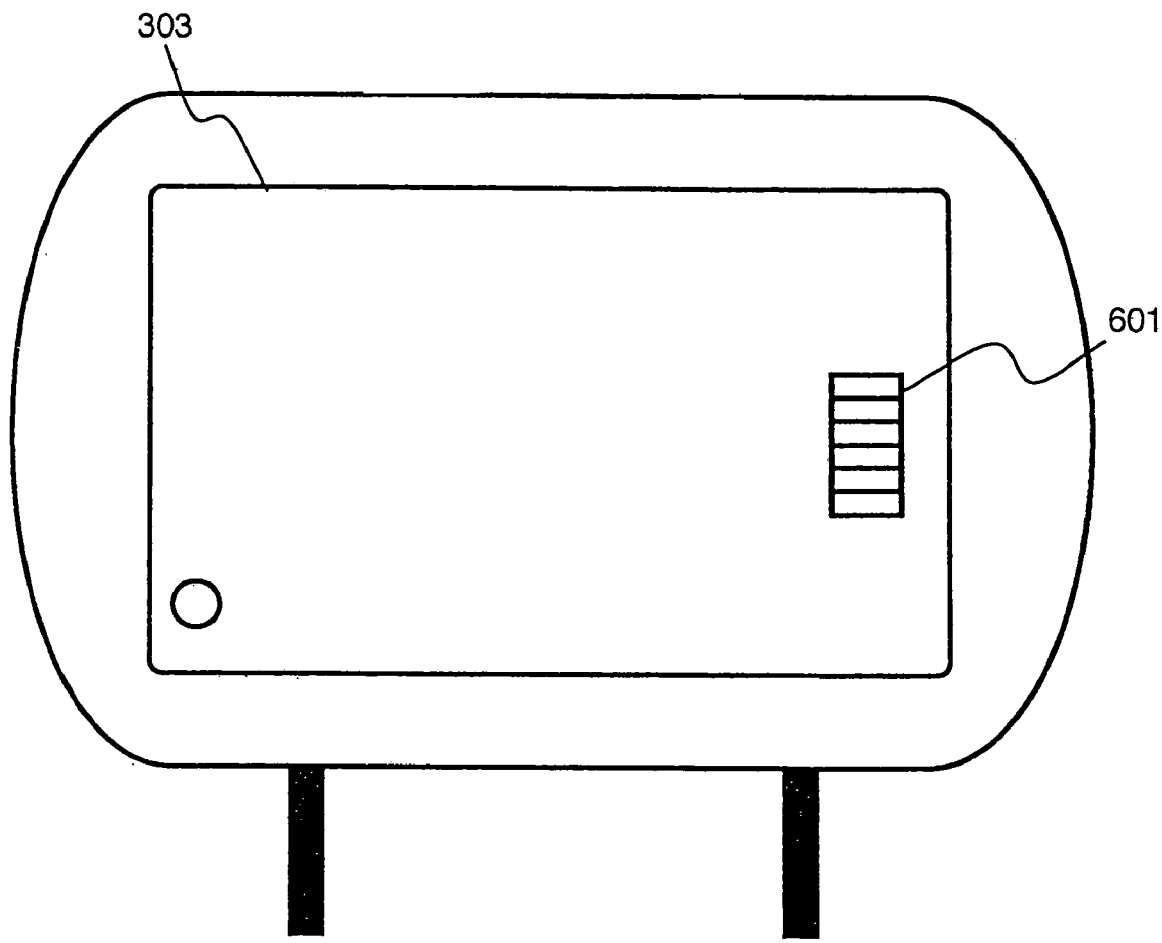
FIG. 6A is an illustration of a docking station according to an embodiment of the present invention.
Figure 6B:
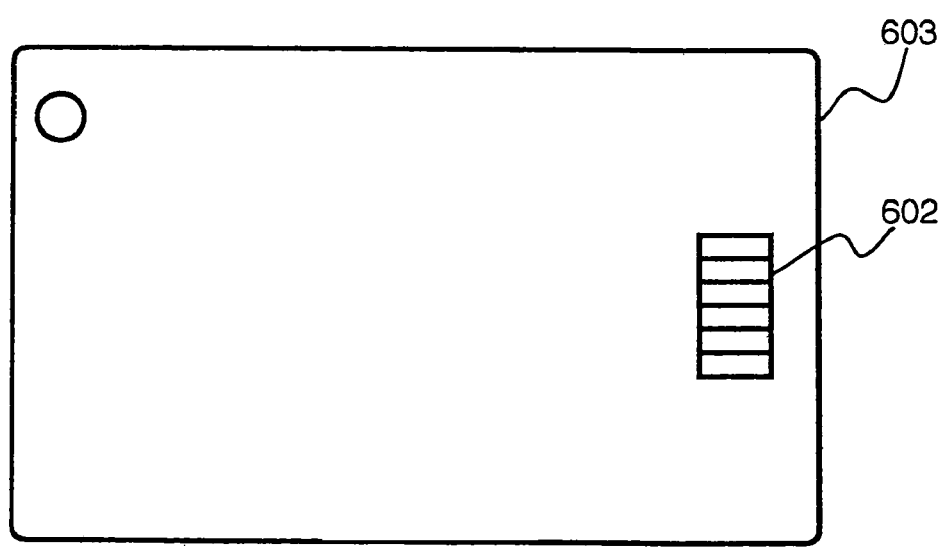
FIG. 6B is an illustration of a rear view of a video system according to an embodiment of the present invention.

Referring now to FIGS. 6A and 6B, the docking station 303 comprises a pin array 601 for connecting to a pin array 602 of a video system 603. The video system 603 can be a slot-type device, a clamshell-type device, or any other device that is capable of being secured in the docking station 303. When the video system 603 is secured to the docking station 303, the pin array 601 and video system pin array 602 transfer data to and from the video player 603. Thus, the video player can be connected to external devices through the docking station 303. The external devices include, for example, a slave video display unit installed in another headrest, a security system, and a vehicle sound system. Where the video system 603 is permanently installed in the headrest, the docking station can be omitted, and a connection to the vehicle's power supply and/or data bus can be directly coupled to the video system 603 through, for example, an electrical harness.

The docking station 303 is coupled to a vehicle's electrical system. The docking station 303 is connected to a vehicle's power supply, e.g., 12 Volts, through a wiring harness. Power can be supplied to the video system 603 through the pin arrays 601 and 602. The docking station 303 can be connected to a vehicle's data communication bus. The data communications bus can carry data to and from the external devices.

Figure 7A:
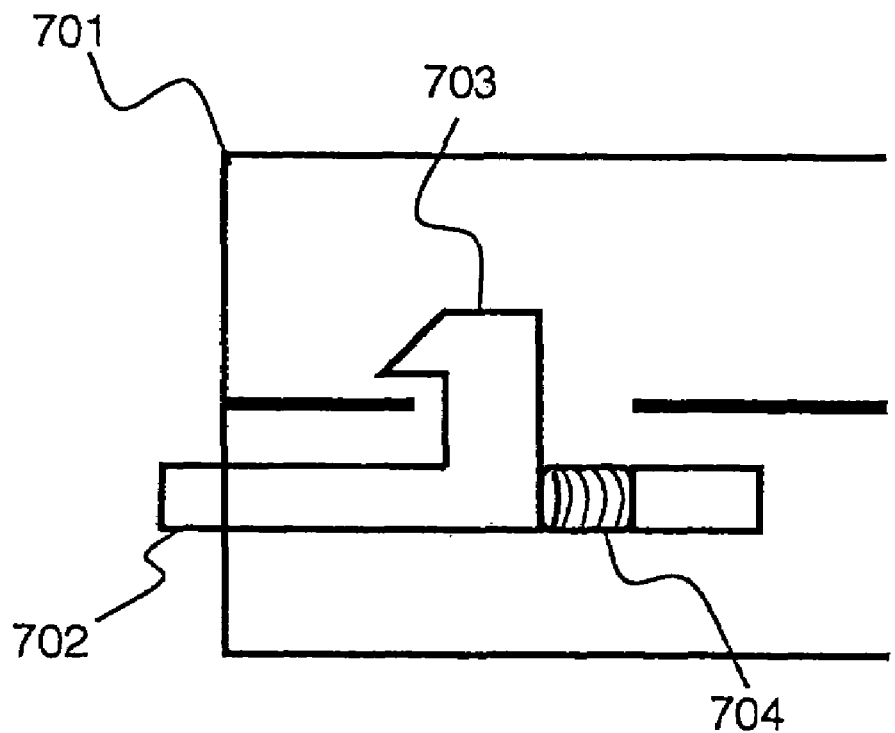
FIGS. 7A and 7B are illustrations of mechanisms for coupling a video system and a docking station according to an embodiment of the present invention.
Figure 7B:
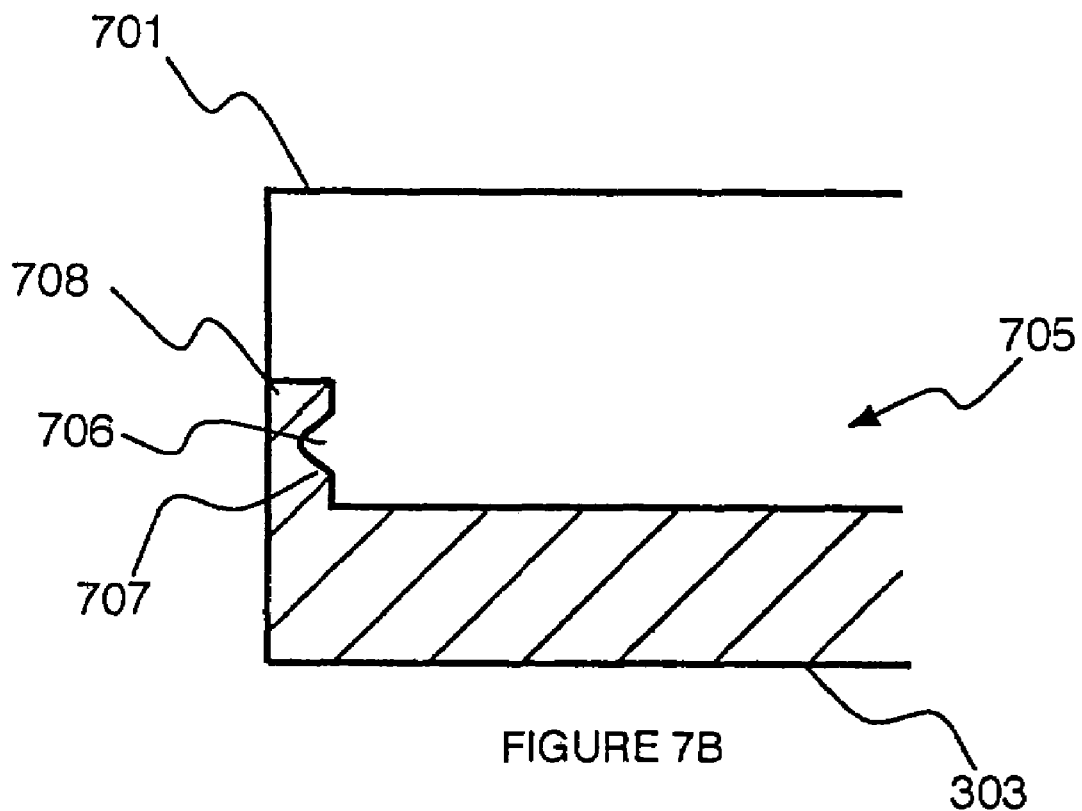

Referring to FIG. 7A, the docking station 303 comprises a quick release mechanism for securing and releasing the video system 701. The quick release mechanism can include a button 702 for releasing a latch 703, which is secured to the video system 701 by pressing the video system 701 securely into the docking station 303. A latch mechanism comprises a latch 703 that passes into a bottom portion of the video system 701. The latch 703 is momentarily displaced as the video system 701 is coupled with the docking station 303. A spring 704 secures the latch 703 in the bottom portion of the video system 701. The button 702 can be pressed, aligning the latch 703 with an opening in the bottom portion of the video system 701, and the video system 701 can be pulled away from the docking station 303. As shown in FIG. 7B, a rear portion 705 of the video system 701 can be secured by a convex portion 706 that fits within a concave portion 707 in the docking station 303. As the video system 701 is pressed into the docking station 303, a wall of the docking station 708 flexes away from the rear portion of the video player until the convex portion 706 is aligned with the concave portion 707. The convex portion 706 and the concave portion 707 cooperate to secure the video system 701 to the docking station 303. Thus, a wall of the docking station 708 can be formed of, for example, a flexible thermoplastic rubber. Other means of securing the video system 701 to the docking station 303 are contemplated, such as, snaps, locks, latches, and the like.

Figure 8:
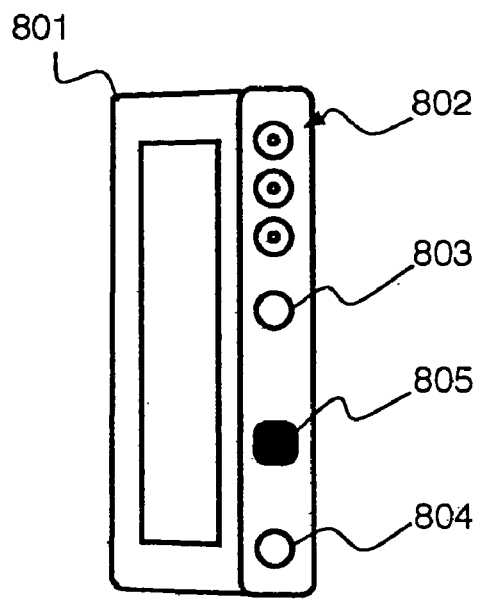
FIG. 8 is an illustration of a video system according to an embodiment of the present invention.

Referring to FIG. 8, the video system 801 comprises input and output ports. For example, audio/video input/output ports 802, a headphone port 803, and a power port 804. It should be understood that other port types can be provided, for example, a USB port or RCA jack for connecting to a game controller. Further, the video system 801 comprises a wireless transmitter for transmitting, for example, an audio radio frequency, Bluetooth®, or Whitefire® signal to wireless headphones. The video system 801 further comprises an infrared (IR) port 805 for transmitting and/or receiving, for example, remote control signals. The ports can be positioned at any convenient location on the video system 801, for example, on a bottom portion of the base of the video system, a front portion of the base of the video system, or a side portion.

Figure 9:
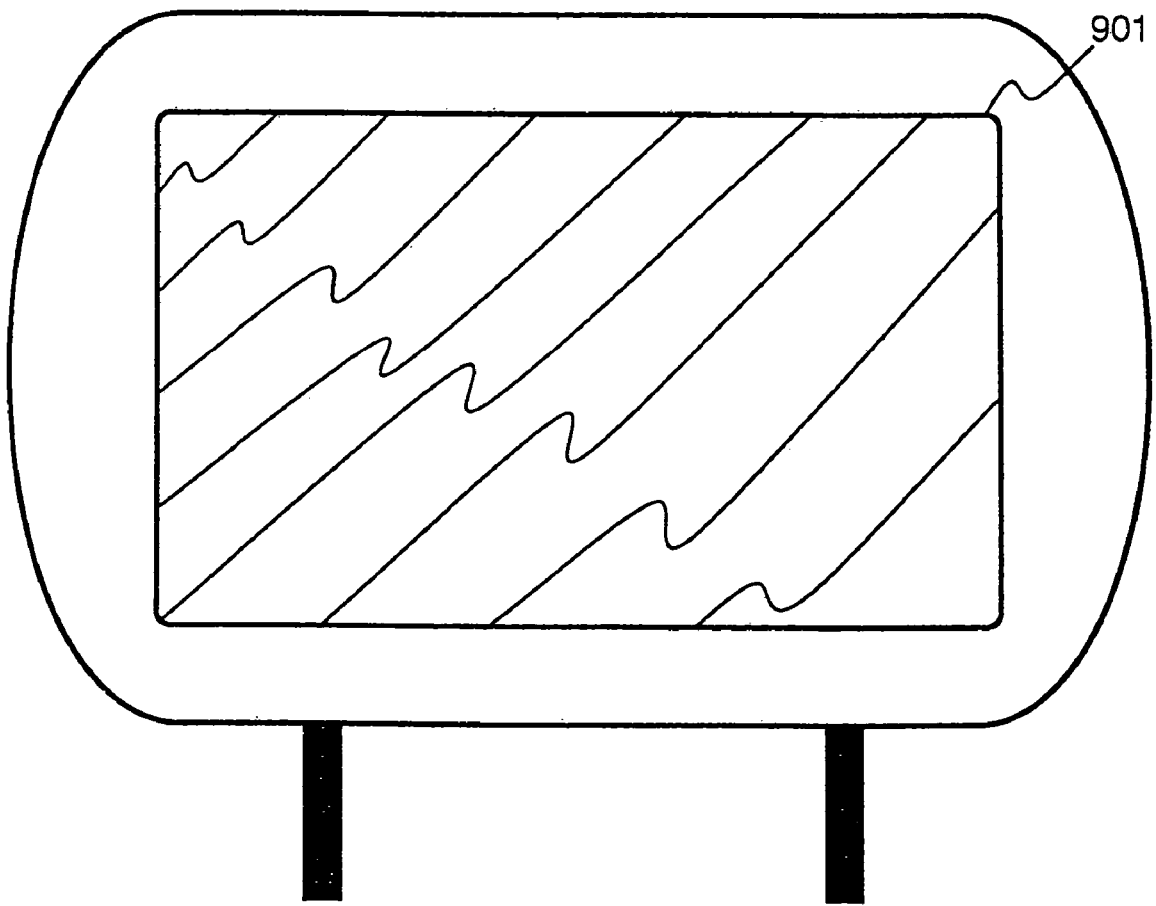
FIG. 9 is an illustration of a docking station cover according to an embodiment of the present invention.

When the video system is removed from the docking station 303, a cover 901 can conceal a portion of the docking station, as shown in FIG. 9. The cover 901 is manufactured from a material such as, plastic, wood, leather, and/or aluminum. The cover 901 can be secured by the same mechanisms as the video system, such as those shown in FIGS. 7A and 7B. Thus, the cover 901 and the video player can have one or more features in common, such as openings for receiving latches and the like.

It is to be appreciated that a portable video system according to the present invention is easily removable from and can be operated outside of a vehicle, for example, in home or office environments. Further, the video system can be permanently connected to the headrest support structure by, for example, screws, catches, and adhesives.

Figure 10:
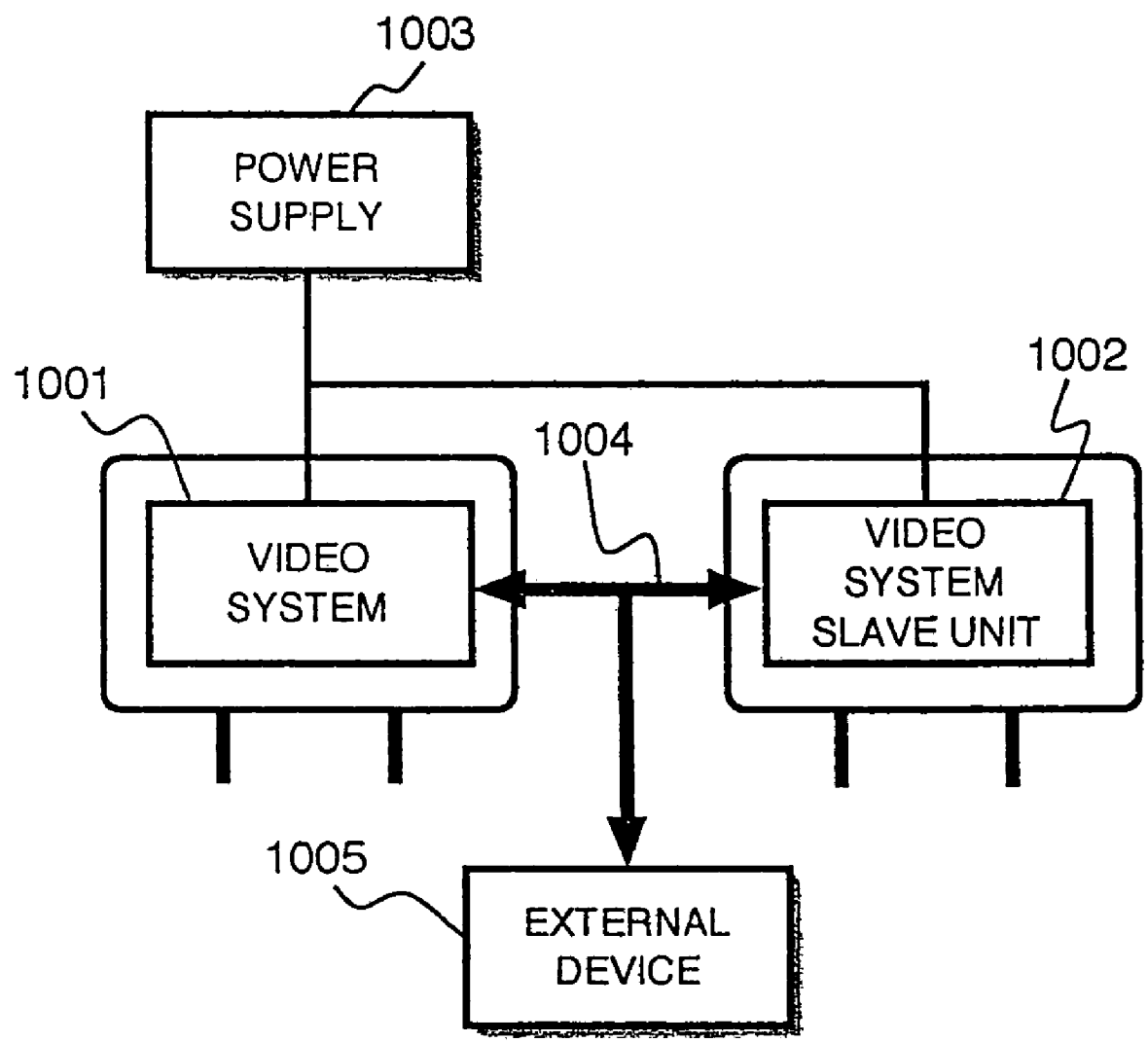
FIG. 10 is a diagram of a system according to an embodiment of the present invention.

Referring now to FIG. 10, a video system 1001 and a video slave unit 1002 are connected to a power supply 1003. The video slave unit receives data to be displayed from the video system 1001 through a data bus 1004. The data bus 1004 can be connected to other devices 1005, such as a vehicle's sound system or a vehicle's navigation system. The connections between the video system 1001 and the external device 1005 can be a wireless connection (not shown). Similarly, the connection between the video system 1001 and the video system slave device 1002 can be a wireless connection (not shown).

Figure 11A:
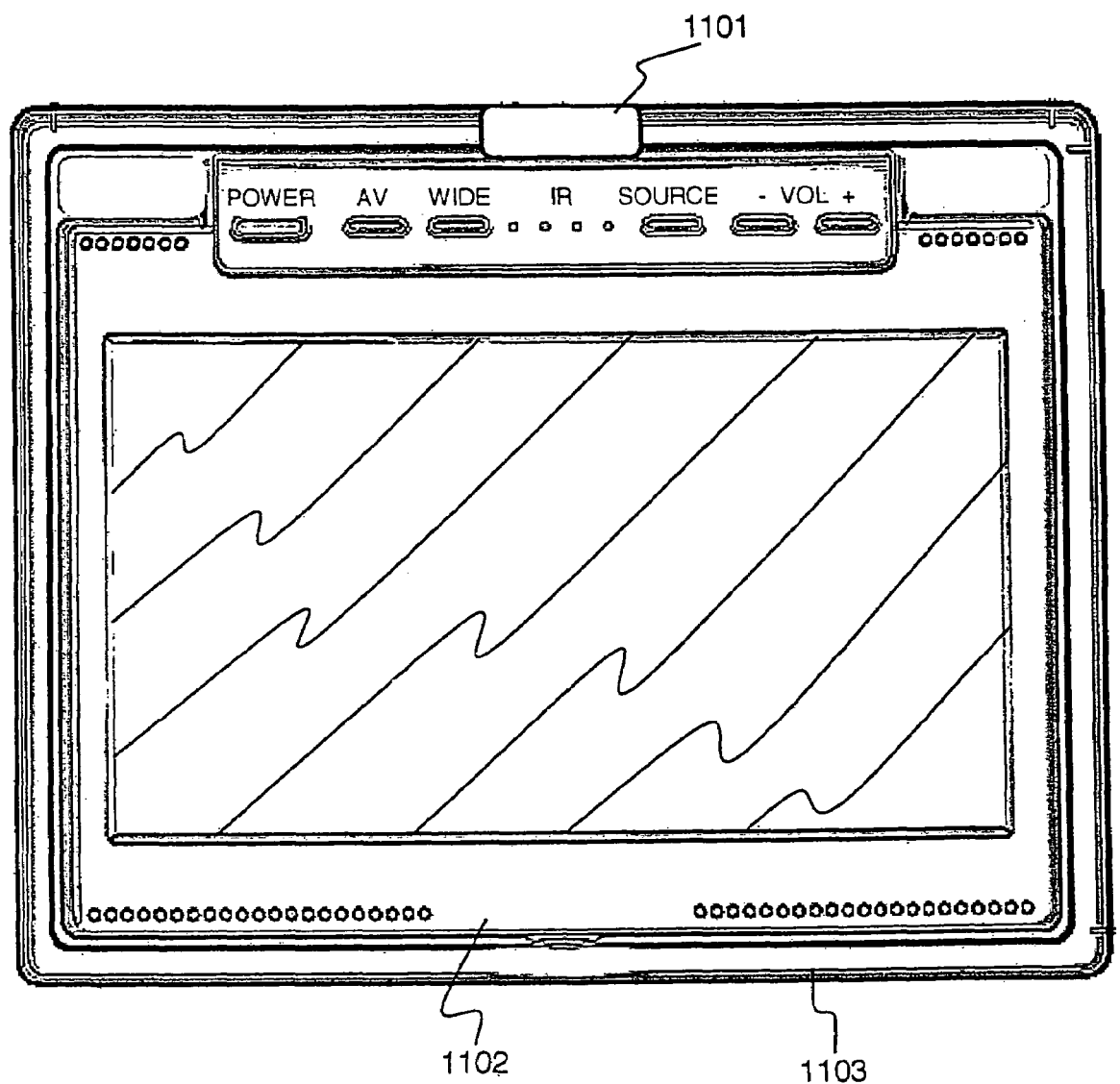
FIGS. 11A and 11B are illustrations of a video system according to an embodiment of the present invention.
Figure 11B:
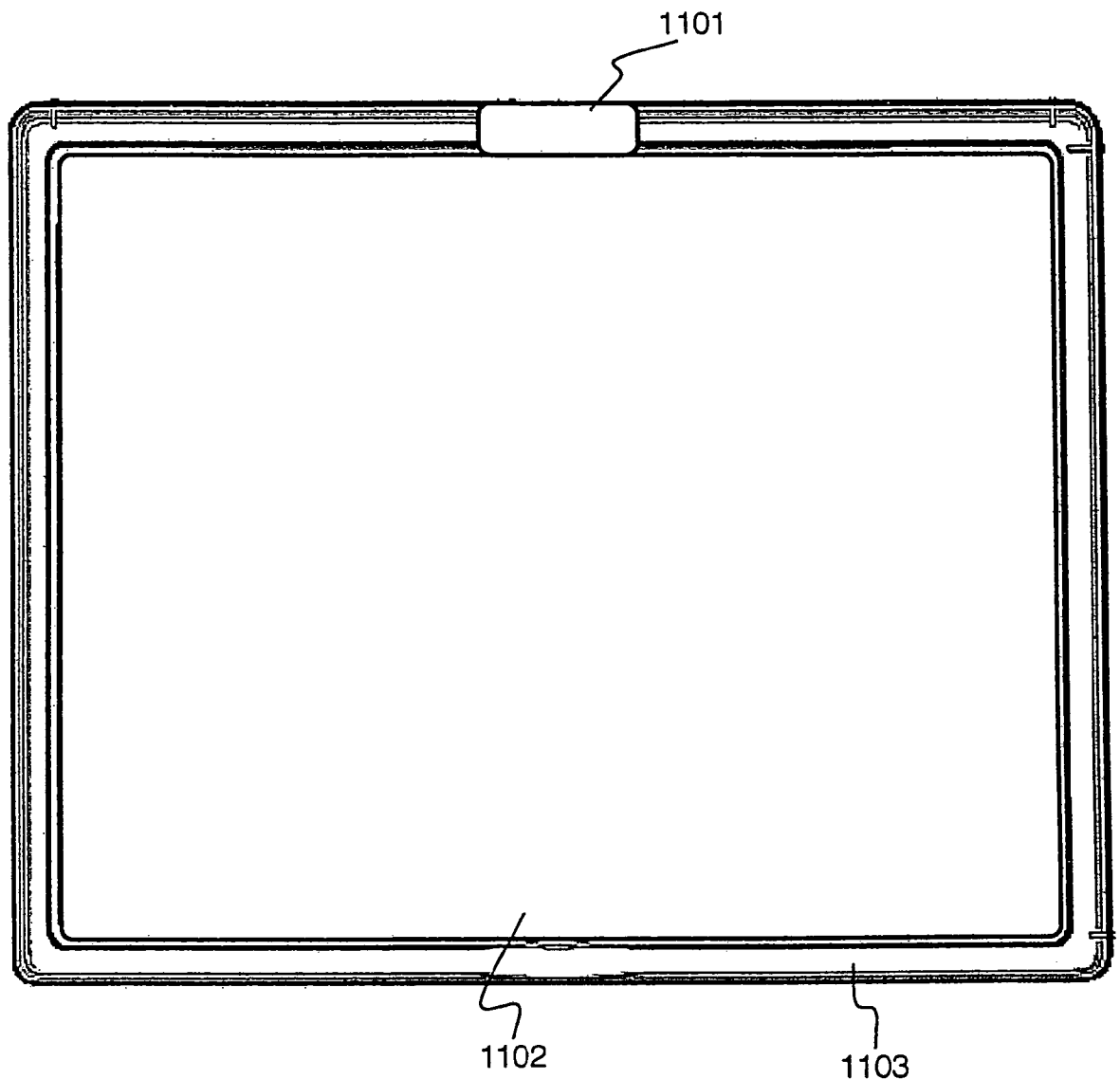

While the video system has been described in terms of a clamshell-type device and a slot-type device, the video system can be embodied in other configurations, for example, as a draw-type device comprising a draw and a spindle for securing the data media in place. Another example of a video system according to an embodiment of the present invention is a tablet-type device comprising a swivel-hinge connecting a video screen to a base portion as shown in FIGS. 11A and 11B. The swivel-hinge 1101 allows a door 1102 comprising a screen to move about two axes such that the screen 1102 can be swiveled about the swivel-hinge 1001 while in an open position, pivoted away from the base 1103. The screen can be turned to face the base portion 1103 when in a fully closed position (e.g., FIG. 11B) or turned to face away from the base portion 1103 in a closed viewing position (e.g., 11A). In both the fully closed position and the closed viewing position, the door 1102 is substantially parallel to the base portion 1103. The swivel-hinge 1101 can be implemented in a slot-type device or a clamshell-type device.

Figure 12A:
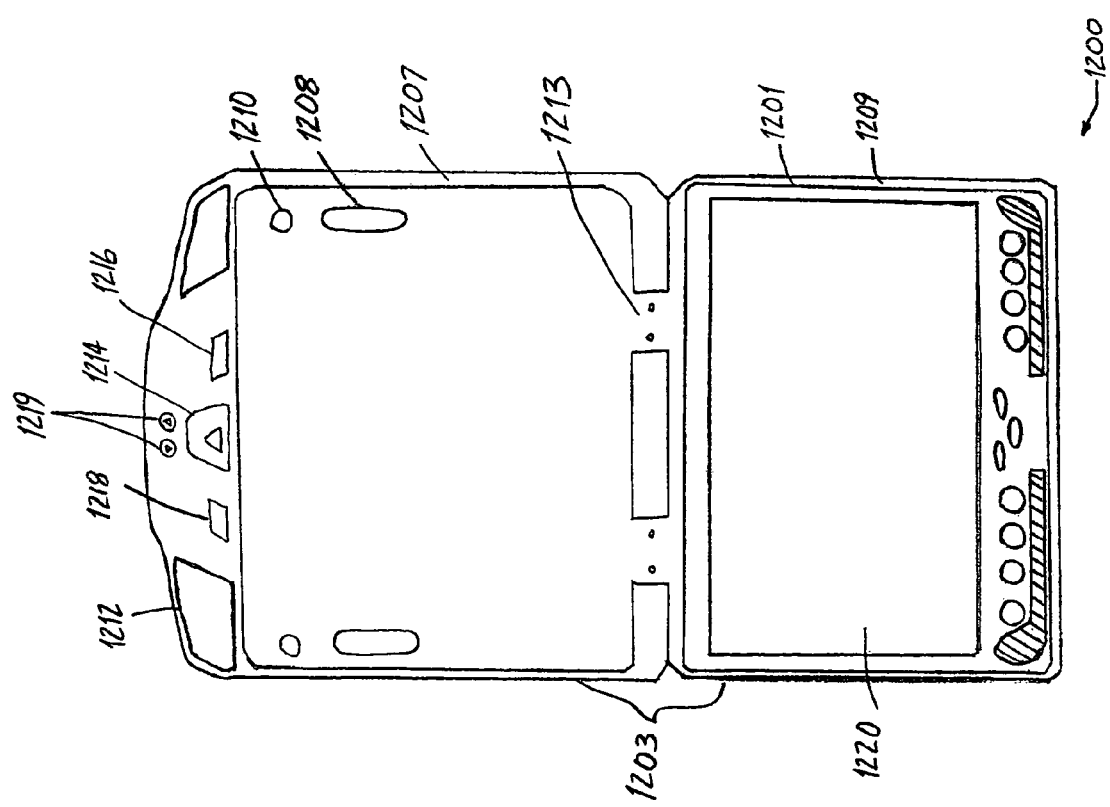
FIGS. 12A-12C are illustrations of a video system and an overhead docking station according to an embodiment of the present invention.
Figure 12B:
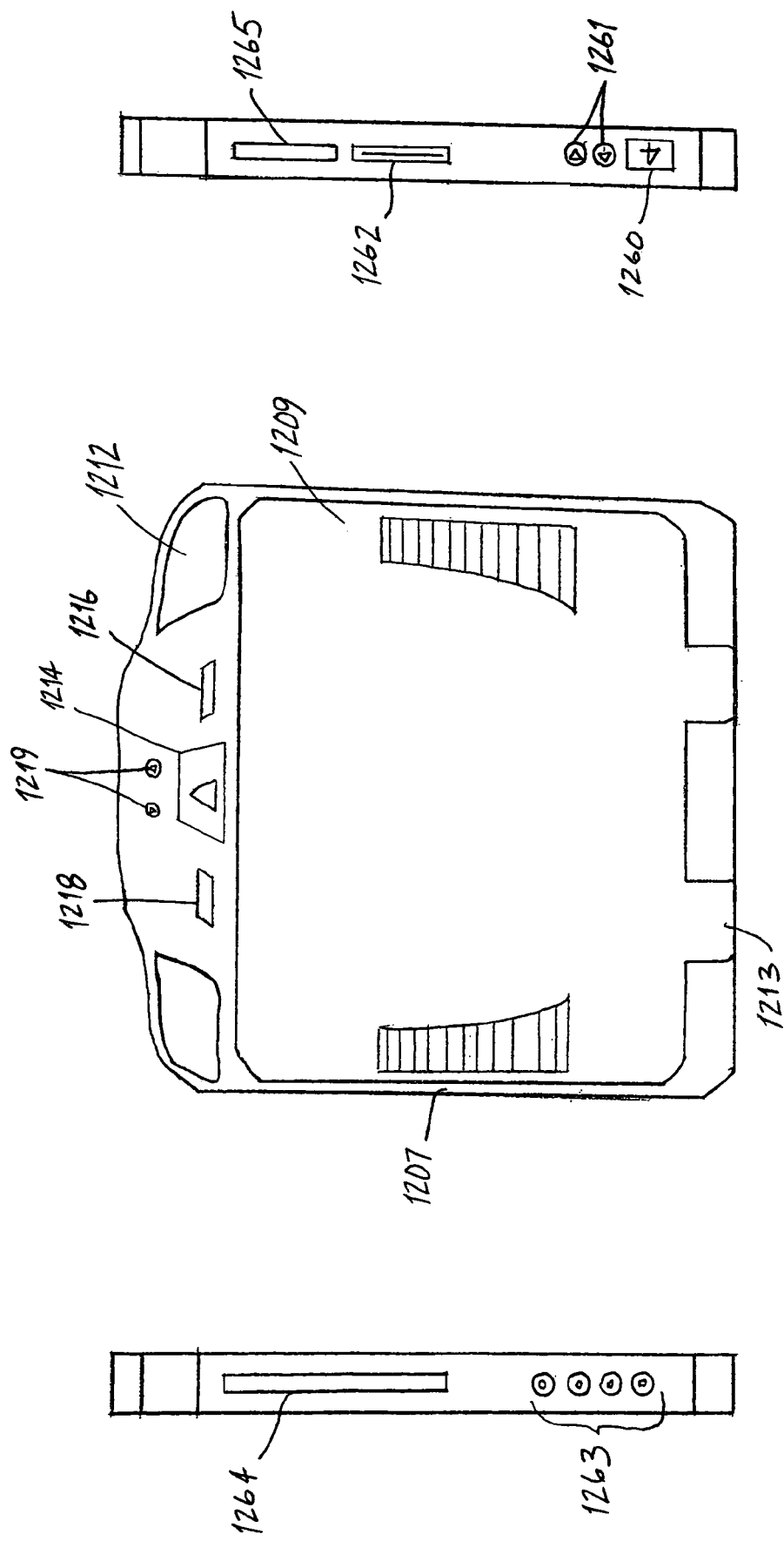
Figure 12C:
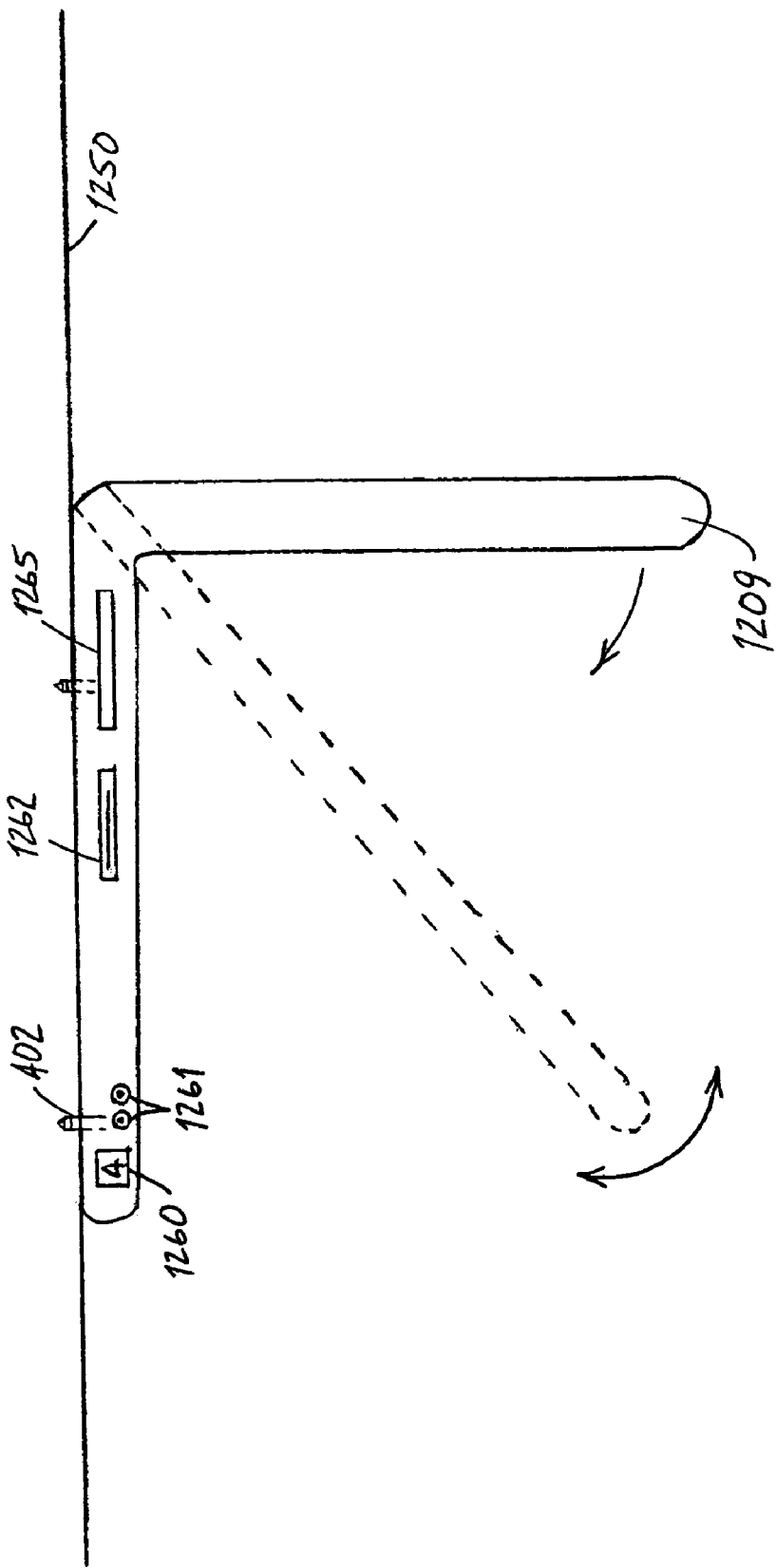

Referring to FIGS. 12A-12C, an entertainment system 1200 includes a docking station 1203 and video system 1201 mounted to the docking station 1203. The docking station 1203 is preferably mounted in a vehicle to the vehicle ceiling 1250 and includes stationary and swinging portions 1207 and 1209. The docking station 1203 also may be mounted in another portion of a vehicle, such as to a wall or to a seat in the vehicle. In addition, the docking station 1203 can be mounted outside of a vehicle, such as under a kitchen cabinet or to a wall or ceiling in a home or office. The docking station includes holes 1208 and 1210 in the stationary portion 1207 through which screws 402 pass into a surface to which the docking station 1203 is mounted. The docking station 1203 may be mounted to a surface using clips 401, screws 402, brackets, adhesive, nails, rivets or any suitable mounting mechanism known to one of ordinary skill in the art.

The docking station 1203 includes lights 1212 which can be turned on or off by user or wired to operate like standard overhead lighting when the docking station 1203 is mounted in a vehicle, such that the lights can be switched on or off and turn on automatically when a door of the vehicle is ajar. The function of the lights 1212 is controlled with a switch 1216.

The video system 1201 mounts to the swinging portion 1209 of the docking station 1203 using, for example, a quick release mechanism or concave/convex portions the same or similar to those described in connection with FIGS. 7A and 7B. Other means of securing the video system 1201 in the docking station 1203 are contemplated, such as, snaps, locks, latches, and the like. Referring to FIGS. 6A and 6B, an electrical connection between the video system 1201 and the docking station 1203 is provided through pin arrays 601 and 602. A pin array 602 of the video system 1201 is located on a rear portion of the video system housing. Data to and from the video system 1201, such as video and audio signals, is transferred through the pin arrays 601 and 602. Further, power from the vehicle can be transmitted to the video system 1201 through the pin arrays 601 and 602. An electrical connection between the video system 1201 and the docking station 1203 may be provided through connectors other than pin arrays known to those of skill in the art for transferring audio and video signals and power.

The swinging portion 1209 is coupled to the stationary portion 1209 with a hinge mechanism 1213 that allows the swinging portion 1209 to rotate about a horizontal axis between the stationary and swinging portions 1207 and 1209. The hinge mechanism 1213 allows the swinging portion 1209 to rotate approximately 180° and to lock in different positions at desired viewing angles of the screen 1220 of the video system 1201. Alternatively, a hinge mechanism allowing a more limited range of motion, for example, from about 0° to 90° may be used.

As shown in FIG. 12B, the swinging portion 1209 closes against the stationary portion 1207 so as to conceal the video system 1201 and occupy less space when not in use. The swinging portion 1207 preferably locks in place with a latch mechanism that can be released by depressing a button 1214.

The video system 1201 has the capability of playing video programs received through the docking station 1203. For example, the docking station 1203 includes a TV tuner that receives television signals for broadcast by a video system mounted therein. A channel display 1260 and channel selector buttons 1261 for selecting a television channel are positioned on a side panel the docking station 1203, but may be positioned on other convenient portions of the docking station 1203. Additionally, the docking station may include a radio tuner (not shown).

The docking station 1203 also includes ports for connecting to external media devices, such as a universal serial bus (USB) port 1262 and input/output ports 1263. The ports 1262 and 1263 are used to connect devices, such as an MPEG player, a card reader, a DVD player, a CD-ROM player, a video game player, a videocassette player, and a digital video recorder. For example, audio input ports include XLR and RCA jacks and video input ports include S-video connections, RCA connections, F-connections, and component video. The input/output ports 1263 also can include, for example, a headphone port and a power port.

The docking station 1203 includes slots 1264 and 1265 of different sizes for receiving DVDs, CDs, flash cards, secure digital (SD) cards, smart media (SM) cards and memory stick (MS) cards. Accordingly, the docking station 1203 is capable of reading various types of media storage mediums and transferring audio and video data from the media storage medium to a video system 1201 connected thereto for broadcast on the video system 1201. As an alternative to using slots, media storage mediums can also be inserted into the docking station using a clamshell type design. In addition, a drawer type design may also be implemented whereby a holder for a media storage medium slides out of the docking station (like a drawer) to permit insertion of a media storage device in the holder.

The docking station 1203 also includes a control switch 1218 for turning a display 1220 of the video system 1201 on and off and selector buttons 1219 for selecting a program from a desired media source for display. For example, a user may depress the selector buttons 1219 to select a program from an MPEG player to be displayed on the video system 1201.

Figure 13A:
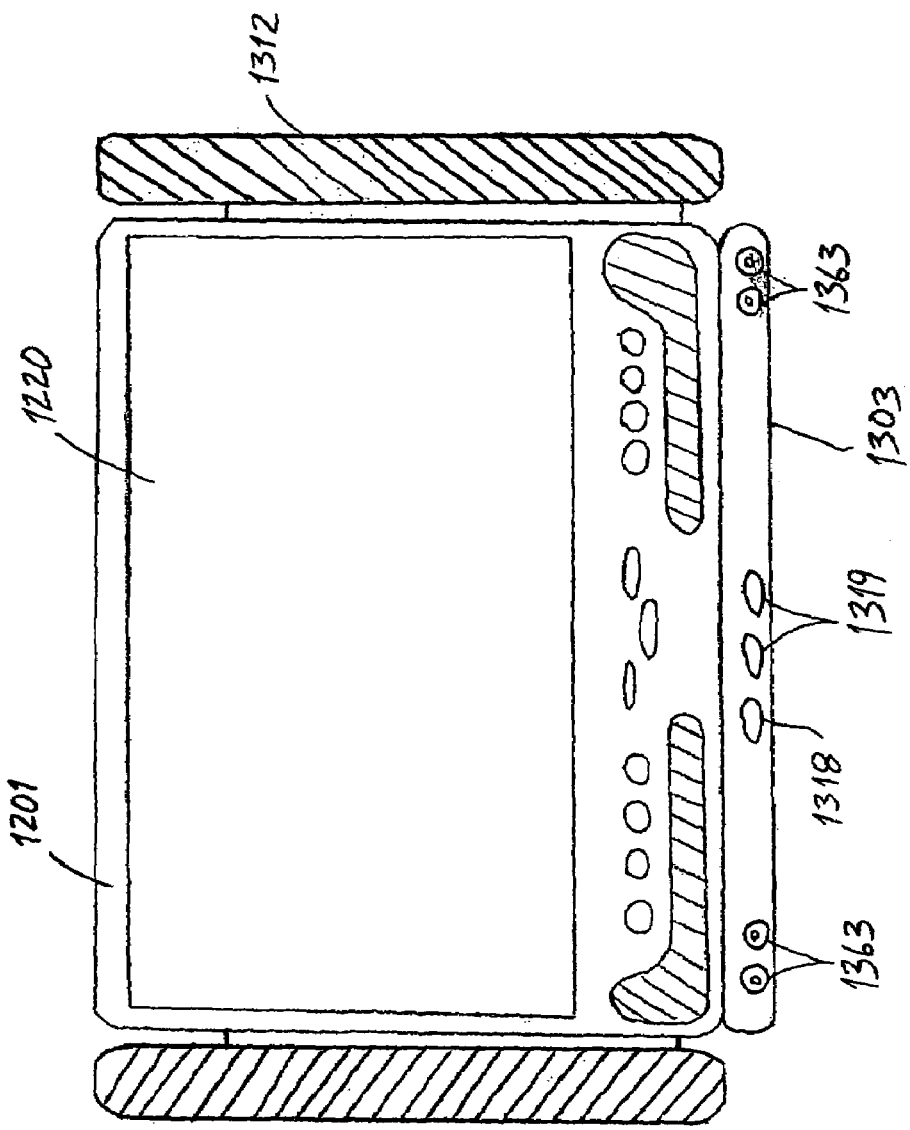
FIGS. 13A-13B are illustrations of a video system and a tabletop docking station according to an embodiment of the present invention.
Figure 13B:
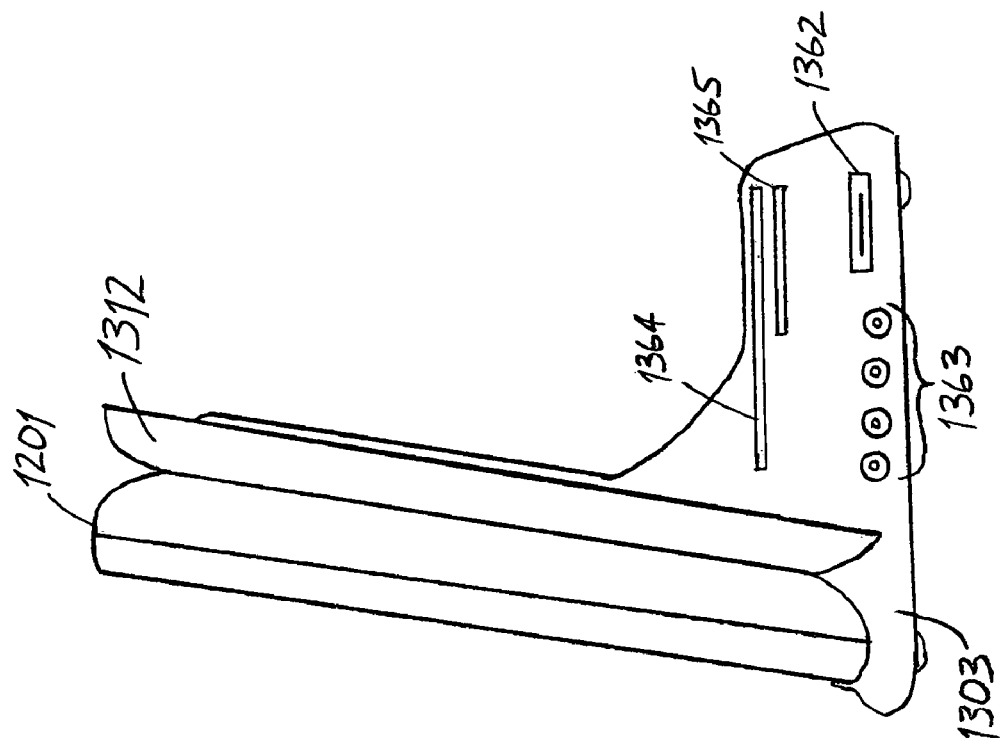

Referring to FIGS. 13A-13B, a video system 1201 is connected to a tabletop docking station 1303. The docking station 1303 is free standing and may be placed on a desk, table or counter, for example. Like the connection to the docking station 1203, a quick release mechanism or concave/convex portions the same or similar to those described in connection with FIGS. 7A and 7B or other means, such as snaps, locks, latches, and the like, can be used to secure the video system 1201 to the docking station 1303. Also, an electrical connection between the video system 1201 and the docking station 1303 for providing data and power between the docking station 1203 and the video system 1201 is provided through pin arrays 601 and 602 located on the docking station 1303 and the video system 1201, respectively. An electrical connection between the video system 1201 and the docking station 1303 may be provided through connectors other than pin arrays known to those of skill in the art for transferring audio and video signals and power.

Like the docking station 1203, the docking station 1303 includes a USB port 1362 and various input/output ports 1363 for connecting to outside media devices, headphones and/or a power supply. For example, the docking station 1303 includes a power port for connecting to a power supply through an AC/DC adapter. The docking station 1303 also may connect to a battery pack (not shown) similar to the battery pack 1501 shown in FIG. 15 for powering the docking station 1303 and a video system 1201 connected thereto.

The docking station 1303 includes slots 1364 and 1365 of different sizes for receiving media storage mediums such as DVDs, CDs, flash cards, secure digital (SD) cards, smart media (SM) cards and memory stick (MS) cards. Like the docking station 1203, clamshell and drawer type designs also may be used for insertion of media storage mediums in the docking station. The docking station 1303 is capable of reading various types of media storage mediums and transferring audio and video data from the media storage medium to a video system 1201 connected thereto for broadcast on the video system 1201. The ports 1362, 1363 and slots 1364, 1365 can be located on the front, side or rear of the docking station 1303.

The docking station 1303 also includes speakers 1312 for broadcasting audio programs or audio associated with a video program. Like the docking station 1203, the docking station 1303 may include TV and radio tuners, a control switch 1318 for turning a display 1220 of the video system 1201 on and off and selector buttons 1319 for selecting a program from a desired media source for display. For example, a user may depress the selector buttons 1319 to select a program from an MPEG player to be displayed on the video system 1201.

Figure 14:
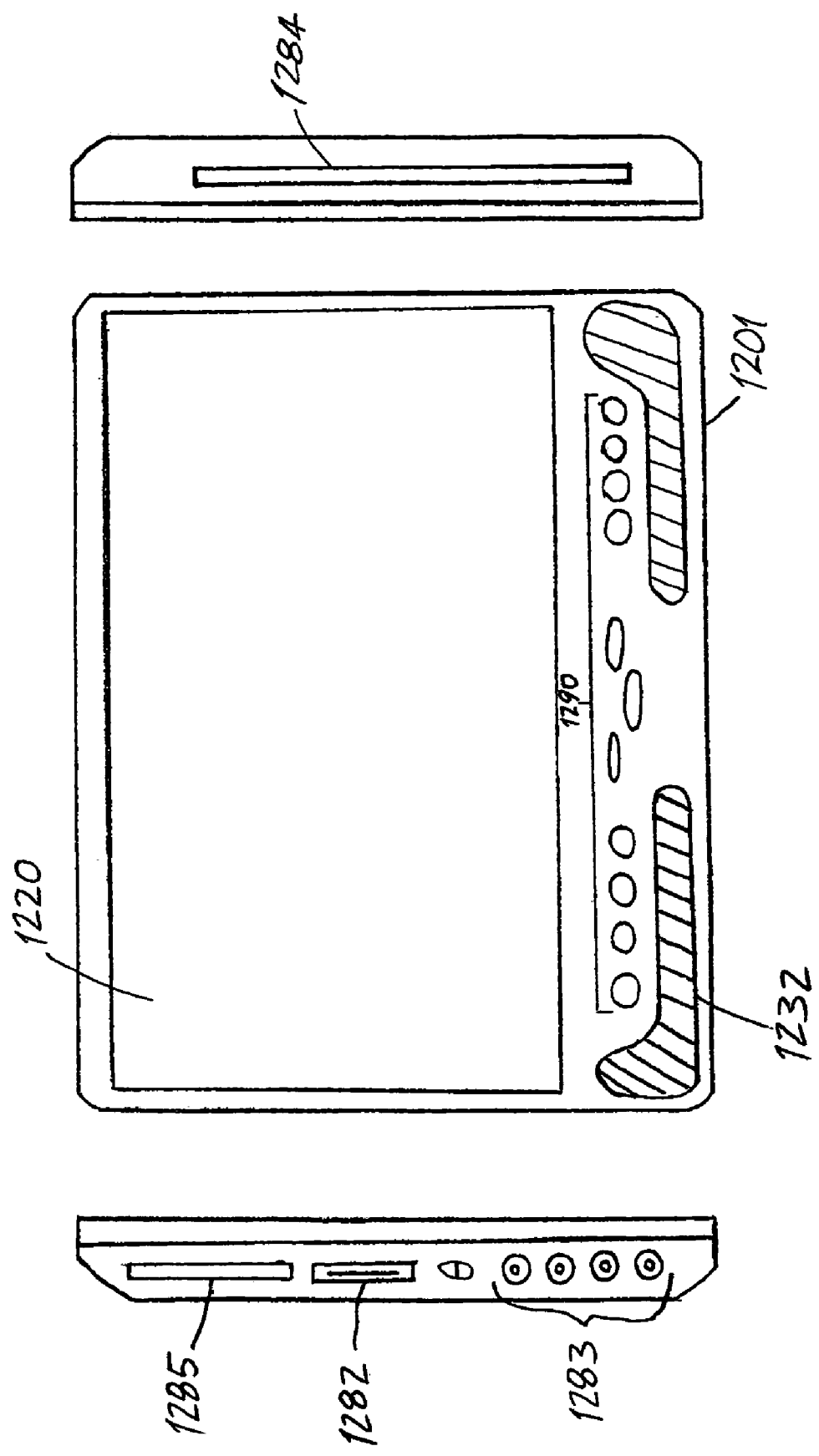
FIG. 14 is an illustration of a video system according to an embodiment of the present invention.

Referring to FIG. 14, a video system 1201 capable of being connected to a docking station 1203/1303 is shown. The video system 1201 includes a display 1220, which is preferably a liquid crystal display (LCD). Alternatively, the display 1220 can be a cathode ray tube (CRT), gas plasma or organic electro-luminescent display (OELD) device. The size of the display is approximately 7 inches to approximately 12 inches.

Like the docking stations 1203/1303, the video system includes ports for external media players, headphones or power and slots for receiving media storage mediums. For example, the video system 1201 includes a USB port 1282 and input/output ports 1283. A control switch 1287 is set to IN or OUT controlling whether the ports are input or output ports. For example, if the control switch is set to IN, a device, such as a portable DVD player, can be connected to the video system 1201 via audio and video IN ports to allow for display of a video program from the portable DVD player on the video system 1201.

The video system 1201 includes a power port for connecting to a power supply through an AC/DC adapter. Further, as shown in FIG. 15, the video system 1201 also may connect to a battery pack 1501 for powering the video system 1201. The connection between the video system 1201 and the battery pack 1501 is provided through respective pin arrays 1295 and 1595 located on the video system 1201 and battery pack 1501. The position of the pin array 1295 on the video system 1201 may vary depending on the number and location of ports and slots incorporated into the video system 1201. Connectors other than pin arrays known to those skilled in the art may also be used.

The slots 1284 and 1285 are different sizes for receiving a variety of media storage mediums such as DVDs, CDs, video CDs (VCDs), flash cards, secure digital (SD) cards, smart media (SM) cards and memory stick (MS) cards. Like the docking stations 1203/1303, clamshell and drawer type designs also may be used for insertion of media storage mediums in the video system 1201. The video system 1201 is capable of reading the various types of media storage mediums inserted therein for broadcast on the video system 1201. The ports 1282, 1283 and slots 1284, 1285 can be located on the front, side or rear of the video system 1201.

The video system 1201 is capable of operating independent of the docking stations 1203/1303, relying on power supplied through a connection to a standard power supply (e.g., an adapter connected to a household outlet) or through the battery pack 1501. Media players, such as a DVD player, are built into the video system 1201 or can connect to the video system 1201 via the ports 1282 and 1283.

When connected to a docking station 1203/1303, the video system 1201 is capable of receiving video and audio programs through the docking station 1203/1303 from media players connected to the docking station 1203/1303. Alternatively, the video system 1201 can broadcast video programs received from media players built into the video system 1201 or directly connected to the video system 1201 via ports 1282 and 1283. It should also be understood that a video display device, not having any media sources built into the video display device or connected thereto, can be connected to the docking station 1203/1303 and receive the video programs for broadcast through media players connected to the docking station 1203/1303.

The video system 1201 includes speakers 1232 for broadcasting audio programs or audio associated with a video program. Like the docking stations 1203/1303, the video system 1201 may include TV and radio tuners. The video system 1201 includes a variety of control buttons 1290 controlling power, source, screen mode, picture selection and functions of a media source, such as stop, pause, previous, play and next. The control buttons 1290 enable a user to control display characteristics and which programs from which sources are displayed. Additional control buttons can include volume control and channel selection.

Having described embodiments for a portable video system capable of being mounted in a vehicle, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A docking station for supporting a removable video system, the docking station comprising:
    a connector for electrically coupling the docking station to the removable video system;
    at least one port for connecting a media source to the docking station, wherein data from the media source is provided to the docking station via the at least one port and to the removable video system via the connector; and
    at least one slot for receiving a media storage medium, wherein data from the media storage medium is provided to the removable video system via the connector.

2. The docking station as recited in claim 1, wherein the at least one port is one of a universal serial bus port, an audio input port, a video input port and an audio/video input port.

3. The docking station as recited in claim 1, wherein the data includes at least one of audio data and video data.

4. The docking station as recited in claim 1, wherein the media source is one of an MPEG player, a card reader, a DVD player, a CD-ROM player, a video game player, a videocassette player, and a digital video recorder.

5. The docking station as recited in claim 1, wherein the media storage medium is at least one of a digital video disc, a compact disc, a video compact disc, a flash card, a secure digital card, a smart media card and a memory stick card.

6. The docking station as recited in claim 1, wherein the data includes at least one of audio data and video data.

7. The docking station as recited in claim 1, further comprising a television tuner, wherein a program received by the television tuner is provided to the removable video system via the connector.

8. The docking station as recited in claim 1, wherein the docking station is mounted in an interior portion of a vehicle.

9. The docking station as recited in claim 8, wherein the docking station is mounted to the ceiling of the vehicle.

10. The docking station as recited in claim 1, wherein the docking station is mounted to one of a ceiling, a wall and a piece of furniture.

11. The docking station as recited in claim 1, wherein the docking station is free standing.

12. The docking station as recited in claim 1, further comprising a stationary portion and a swinging portion attached to the stationary portion, wherein the removable video system is secured to the swinging portion.

13. The docking station as recited in claim 1, further comprising a light positioned on the docking station.

14. The docking station as recited in claim 1, further comprising a speaker positioned on the docking station.

15. The docking station as recited in claim 1, wherein the docking station is connectable to a battery.

16. The docking station as recited in claim 1, wherein the docking station includes a port for connecting to an adapter for a power supply.

17. The docking station as recited in claim 1, wherein the removable video system includes a display capable of displaying video data received from the docking station.

18. The docking station as recited in claim 17, wherein the display is one of a liquid crystal display device, a cathode ray tube device, a gas plasma device or an organic electro-luminescent display device.

19. The docking station as recited in claim 1, wherein the removable video system includes at least one port for connecting a media source to the video system, wherein data from the media source is provided to the video system via the at least one port.

20. The docking station as recited in claim 1, wherein the removable video system includes a media player.

21. The docking station as recited in claim 20, wherein the media player is capable of playing media stored on at least one of a digital video disc, a compact disc, a video compact disc, a flash card, a secure digital card, a smart media card and a memory stick card.

22. The docking station as recited in claim 1, wherein the removable video system is capable of operating when remote from the docking station.

23. The docking station as recited in claim 1, wherein the removable video system is capable of connecting to at least one of a battery and an adapter for a power supply.

24. A video system attachable to a docking station, the video system comprising:
 a display capable of displaying video data received from the docking station; and
 a media player, wherein the video system is capable of operating when removed from the docking station, wherein the docking station includes an electrical connector and at least one slot for receiving a media storage medium, wherein the video data from the media storage medium is provided to the video system via the electrical connector.

25. The video system as recited in claim 24, wherein the video system is capable of connecting to at least one of a battery and an adapter for a power supply.

26. The video system as recited in claim 24, wherein the media player is capable of playing media stored on at least one of a digital video disc, a compact disc, a video compact disc, a flash card, a secure digital card, a smart media card and a memory stick card.

27. The video system as recited in claim 24, further comprising at least one port for connecting a media source to the video system, wherein data from the media source is provided to the video system via the at least one port.

28. The video system as recited in claim 27, wherein the data includes at least one of audio data and video data.

29. The video system as recited in claim 27, wherein the at least one port is one of a universal serial bus port, an audio input port, a video input port and an audio/video input port.

30. The video system as recited in claim 27, wherein the media source is one of an MPEG player, a card reader, a DVD player, a CD-ROM player, a video game player, a videocassette player, and a digital video recorder.

31. The video system as recited in claim 24, further comprising a television tuner, wherein a program received by the television tuner is broadcast on the video system.

32. The video system as recited in claim 24, wherein the docking station is mounted in a room or in an interior portion of a vehicle.

33. The video system as recited in claim 24, wherein the docking station is mounted to a structure or is free standing.

34. The video system as recited in claim 24, wherein the display is one of a liquid crystal display device, a cathode ray tube device, a gas plasma device or an organic electro-luminescent display device.

35. The video system as recited in claim 24, wherein the docking station receives the video data from one of a media source built in to the docking station or an external media source connected to the docking station.

* * * * *